United States Patent
Geerlings et al.

(10) Patent No.: US 10,115,302 B2
(45) Date of Patent: *Oct. 30, 2018

(54) TRAINABLE TRANSCEIVER AND CAMERA SYSTEMS AND METHODS

(71) Applicant: Gentex Corporation, Zeeland, MI (US)

(72) Inventors: Steven L. Geerlings, Holland, MI (US); Todd R. Witkowski, Zeeland, MI (US); Thomas S. Wright, Holland, MI (US); Marc A. Smeyers, Zeeland, MI (US); Jonathan E. Dorst, Holland, MI (US); Douglas C. Papay, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/924,607

(22) Filed: Mar. 19, 2018

(65) Prior Publication Data

US 2018/0211515 A1 Jul. 26, 2018

Related U.S. Application Data

(63) Continuation of application No. 14/690,230, filed on Apr. 17, 2015, now Pat. No. 9,922,548.

(Continued)

(51) Int. Cl.
*G08C 17/02* (2006.01)
*H04W 4/02* (2018.01)
*H04N 5/232* (2006.01)

(52) U.S. Cl.
CPC ......... *G08C 17/02* (2013.01); *H04N 5/23229* (2013.01); *H04W 4/02* (2013.01);

(Continued)

(58) Field of Classification Search
CPC .............. G08C 17/02; H04N 5/23229; H04N 5/23203; H04N 7/18; H04W 4/02;

(Continued)

(56) References Cited

U.S. PATENT DOCUMENTS 5,614,891 A 3/1997 Zeinstra et al.
5,831,669 A 11/1998 Adrain
(Continued)

FOREIGN PATENT DOCUMENTS

DE 10 2010 015 104 A1 10/2011
EP 1 461 791 A1 9/2004
(Continued)

OTHER PUBLICATIONS

U.S. Office Action on U.S. Appl. No. 15/855,738 dated Mar. 26, 2018.

(Continued)

*Primary Examiner* — An T Nguyen
(74) *Attorney, Agent, or Firm* — Foley & Lardner LLP; Bradley D. Johnson

(57) ABSTRACT

A system for installation in a vehicle and for controlling a remote device including a trainable transceiver, a camera, an output device, and a control circuit coupled to the trainable transceiver and the camera. The control circuit is configured to use data received from the camera to determine if the vehicle is well positioned within a garage, and the control circuit is configured to provide an indication that the vehicle is well positioned using the output device in response to determining that the vehicle is well positioned within a garage.

14 Claims, 21 Drawing Sheets

Related U.S. Application Data

(60) Provisional application No. 61/981,527, filed on Apr. 18, 2014.

(52) U.S. Cl.
CPC ..... *G08C 2201/20* (2013.01); *G08C 2201/21* (2013.01); *H04N 5/23203* (2013.01)

(58) Field of Classification Search
CPC .... G07C 9/00896; G08G 1/142; G08G 1/168; G06T 19/006; G06K 9/00671
See application file for complete search history.

(56) References Cited

U.S. PATENT DOCUMENTS

| | | | |
|---|---|---|---|
| 6,091,330 A | | 7/2000 | Swan et al. |
| 6,559,775 B1* | | 5/2003 | King ............... E05F 15/40 340/10.1 |
| 7,602,283 B2* | | 10/2009 | John ............... G08B 21/14 340/539.11 |
| 7,650,864 B2 | | 1/2010 | Hassan et al. |
| 8,643,467 B2* | | 2/2014 | Chutorash .......... G07C 9/00182 340/5.2 |
| 8,878,646 B2* | | 11/2014 | Chutorash ............. G08C 17/00 340/5.71 |
| 9,230,378 B2* | | 1/2016 | Chutorash .......... G07C 9/00182 |
| 9,264,673 B2 | | 2/2016 | Chundrlik et al. |
| 9,412,264 B2 | | 8/2016 | Geerlings et al. |
| 9,428,119 B2 | | 8/2016 | Yellambalase |
| 9,922,548 B2* | | 3/2018 | Geerlings ............. G08C 17/02 |
| 9,970,229 B1* | | 5/2018 | Favila .................... E05F 15/70 |
| 2003/0043021 A1* | | 3/2003 | Chung ............... G07C 9/00309 340/5.71 |
| 2003/0197594 A1 | | 10/2003 | Olson et al. |
| 2003/0197595 A1 | | 10/2003 | Olson et al. |
| 2003/0216139 A1 | | 11/2003 | Olson et al. |
| 2005/0134482 A1 | | 6/2005 | Li |
| 2005/0242970 A1 | | 11/2005 | Blaker et al. |
| 2005/0270177 A1 | | 12/2005 | Mori et al. |
| 2007/0057810 A1 | | 3/2007 | Bos et al. |
| 2007/0115357 A1* | | 5/2007 | Stein .................... B60Q 1/0023 348/148 |
| 2008/0033603 A1* | | 2/2008 | Gensler ............. B62D 15/0285 701/1 |
| 2008/0291047 A1 | | 11/2008 | Summerford et al. |
| 2009/0121852 A1* | | 5/2009 | Breuer .................. G08G 1/165 340/436 |
| 2009/0189779 A1* | | 7/2009 | Gao ..................... G08C 17/00 340/901 |
| 2010/0007516 A1 | | 1/2010 | Bos et al. |
| 2010/0171588 A1* | | 7/2010 | Chutorash .......... G07C 9/00182 340/5.71 |
| 2011/0084126 A1 | | 4/2011 | Fleming et al. |
| 2011/0102196 A1* | | 5/2011 | Kadowaki .......... B62D 15/0275 340/932.2 |
| 2011/0250845 A1* | | 10/2011 | Chutorash ............. G08C 17/00 455/66.1 |
| 2011/0295469 A1 | | 12/2011 | Rafii et al. |
| 2012/0265585 A1 | | 10/2012 | Muirbrook et al. |
| 2013/0085637 A1* | | 4/2013 | Grimm ................ B60W 30/06 701/25 |
| 2013/0141578 A1 | | 6/2013 | Chundrlik et al. |
| 2013/0335561 A1* | | 12/2013 | Kourogi ............. B60R 21/0134 348/140 |
| 2014/0074352 A1* | | 3/2014 | Tate, Jr. ............... B62D 15/028 701/36 |
| 2014/0111315 A1 | | 4/2014 | Geerlings et al. |
| 2014/0118111 A1* | | 5/2014 | Saladin ................... E05F 15/77 340/7.51 |
| 2014/0145824 A1* | | 5/2014 | Chutorash .......... G07C 9/00182 340/5.71 |
| 2014/0160287 A1* | | 6/2014 | Chen ..................... G08G 1/168 348/148 |
| 2015/0084779 A1* | | 3/2015 | Saladin .............. G07C 9/00896 340/686.6 |
| 2015/0281658 A1* | | 10/2015 | Lee .................... H04N 5/23203 348/211.1 |
| 2015/0302735 A1* | | 10/2015 | Geerlings .............. G08C 17/02 340/5.25 |
| 2015/0302736 A1* | | 10/2015 | Geerlings .............. G08C 17/02 340/4.3 |
| 2015/0302737 A1* | | 10/2015 | Geerlings .............. G08C 17/02 340/5.25 |
| 2016/0288833 A1* | | 10/2016 | Heimberger ......... B62D 15/027 |
| 2016/0358474 A1 | | 12/2016 | Uppal |

FOREIGN PATENT DOCUMENTS

| | | |
|---|---|---|
| WO | WO-2006/083953 A2 | 8/2006 |
| WO | WO-2012/103394 A1 | 8/2012 |
| WO | WO-2015/161244 A2 | 10/2015 |

OTHER PUBLICATIONS

Extended European Search Report in EP 15780521.9 dated Mar. 14, 2017, 8 pages.
International Preliminary Report on Patentability and Transmittal received in corresponding International Application No. PCT/US2015/026458 dated Oct. 27, 2016, 8 pages.
International Search Report and Written Opinion of the International Searching Authority in PCT/US2015/015262 dated Jul. 2, 2015, 10 pages.
International Search Report and Written Opinion of the International Searching Authority received in PCT/US2015/026458 dated Nov. 12, 2015, 9 pages.
Notice of Allowance on U.S. Appl. No. 14/690,195 dated Jun. 21, 2017.
U.S. Notice of Allowance on U.S. Appl. No. 14/690177 dated Aug. 28, 2017.
U.S. Notice of Allowance on U.S. Appl. No. 14/690,195 dated Jun. 21, 2017.
U.S. Notice of Allowance on U.S. Appl. No. 14/690,230 dated Nov. 1, 2017.
U.S. Notice of Allowance on U.S. Appl. No. 14/690,230 dated Nov. 28, 2017.
U.S. Office Action on U.S. Appl. No. 14/690,195 dated Oct. 19, 2016.
U.S. Office Action on U.S. Appl. No. 14/690,177 dated Mar. 25, 2016.
U.S. Office Action on U.S. Appl. No. 14/690,177 datd Apr. 5, 2017.
U.S. Office Action on U.S. Appl. No. 14/690,177 dated Sep. 15, 2016.
U.S. Office Action on U.S. Appl. No. 14/690,195 dated Apr. 1, 2016.
U.S. Office Action on U.S. Appl. No. 14/690,230 dated Mar. 24, 2016.
U.S. Office Action on U.S. Appl. No. 14/690,230 dated Jun. 27, 2017.
U.S. Office Action on U.S. Appl. No. 14/690,230 dated Sep. 15, 2016.

* cited by examiner

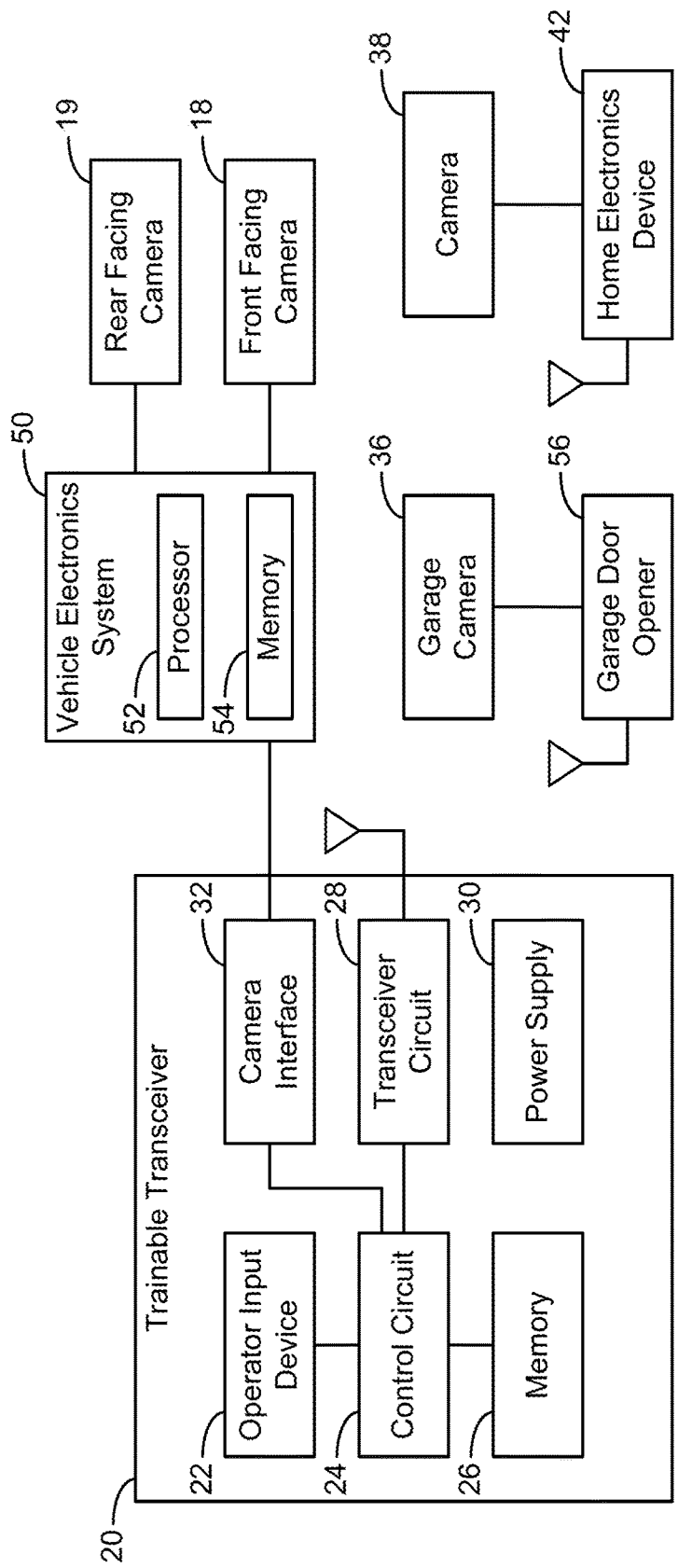

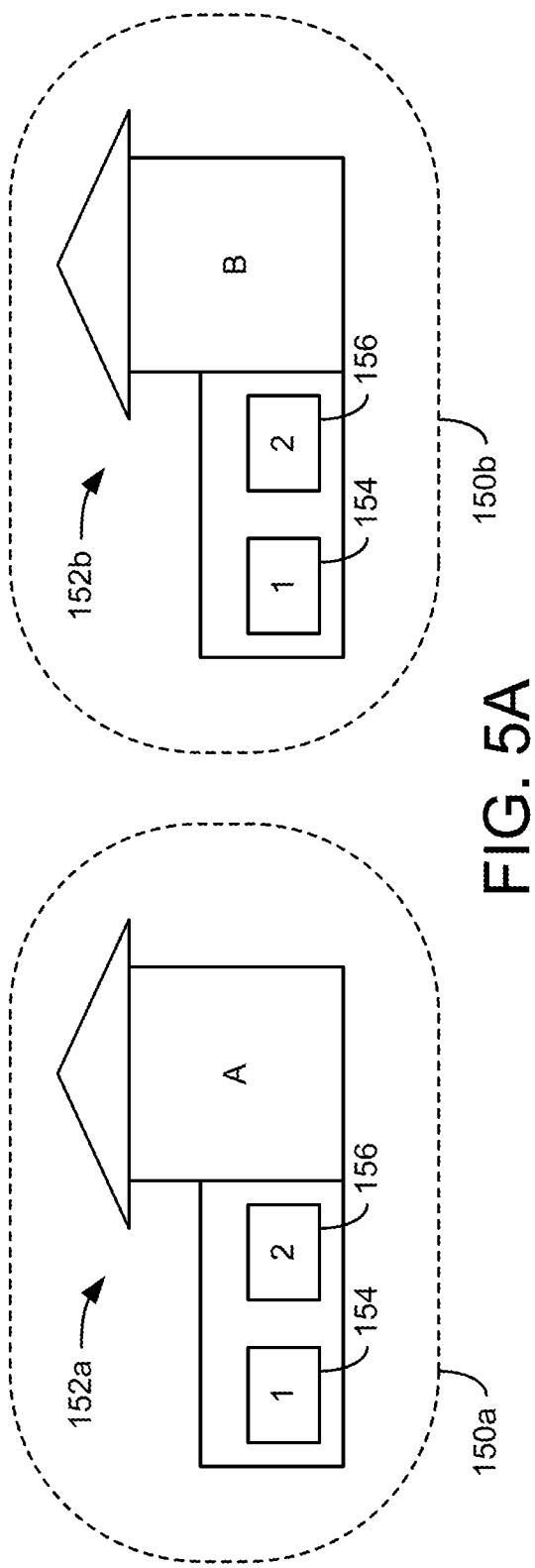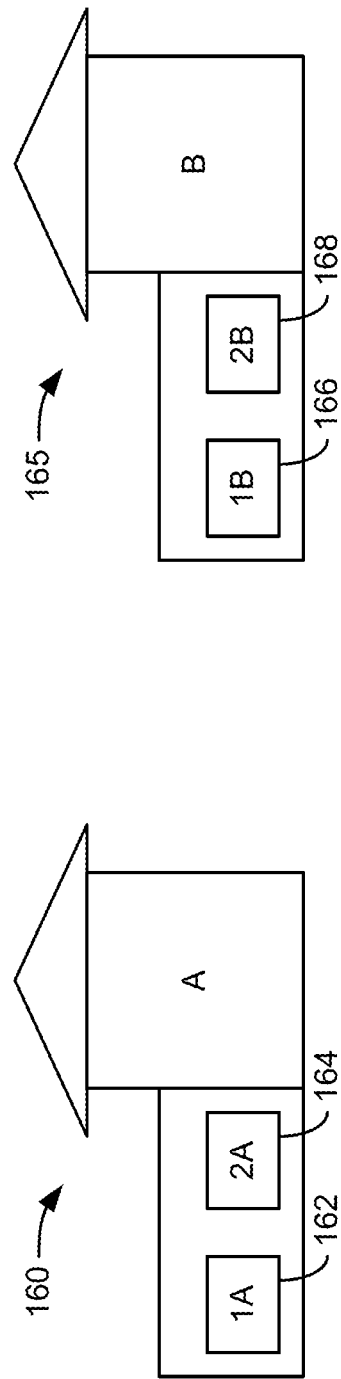
FIG. 5A
FIG. 5B

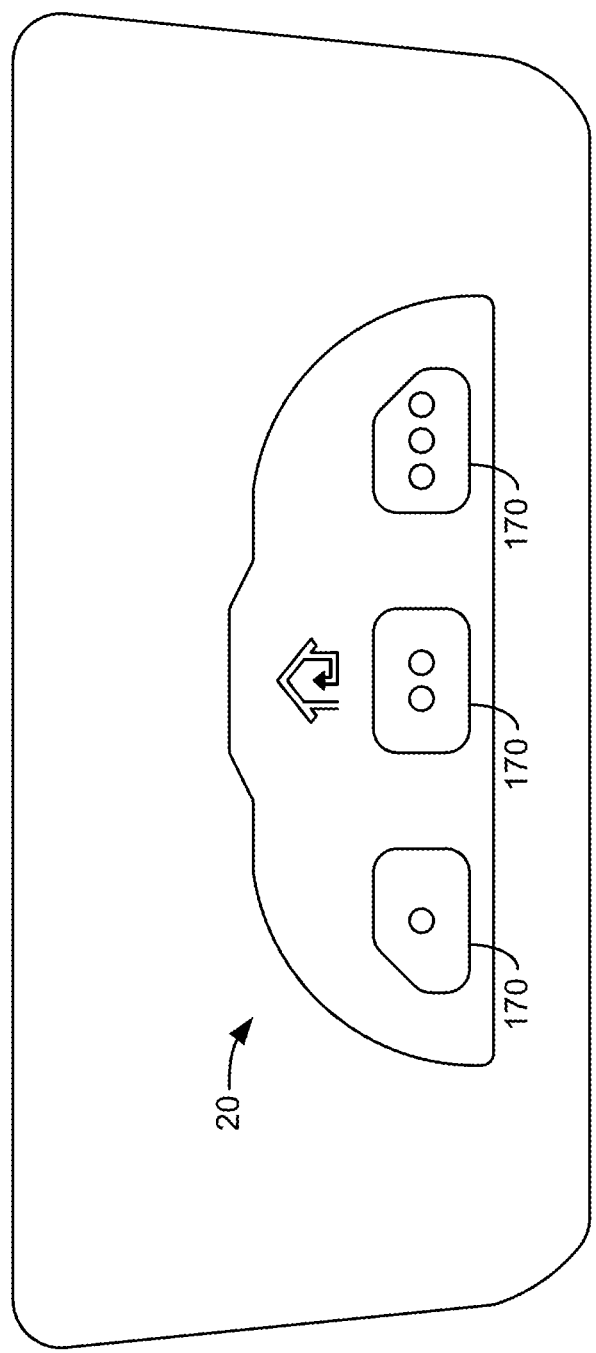

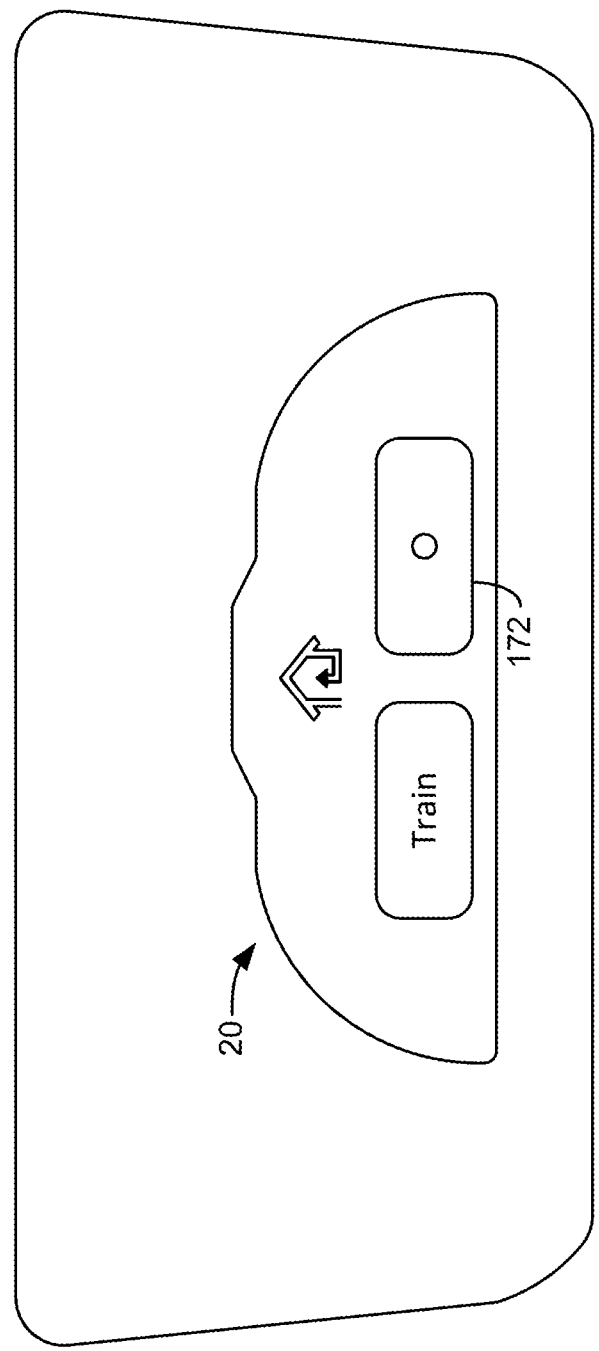

TRAINABLE TRANSCEIVER AND CAMERA SYSTEMS AND METHODS

CROSS-REFERENCE TO RELATED APPLICATIONS

This application claims the benefit and priority under 35 U.S.C. § 120 as a continuation of U.S. patent application Ser. No. 14/690,230, titled "TRAINABLE TRANSCEIVER AND CAMERA SYSTEMS AND METHODS," filed Apr. 17, 2015, which the claims the benefit and priority under 35 U.S.C. § 119(e) to U.S. Provisional Application No. 61/981,527, titled "TRAINABLE TRANSCEIVER AND CAMERA SYSTEMS AND METHODS," filed Apr. 18, 2014, each of which is hereby incorporated by reference in its entirety.

BACKGROUND

The present invention relates generally to the field of trainable transceivers for inclusion within a vehicle. A trainable transceiver generally sends and/or receives wireless signals using a transmitter, receiver, and/or transceiver. The wireless signals may be used to control other devices. For example, a trainable transceiver may send a wireless control signal to operate a garage door opener. A trainable transceiver may be trained to operate with a particular device. Training may include providing the trainable transceiver with control information for use in generating a control signal. A trainable transceiver may be incorporated in a vehicle (integrally or contained within the vehicle) and used to control devices outside the vehicle. It is challenging and difficult to develop trainable transceivers which are easy to train to operate a variety of devices.

SUMMARY OF THE INVENTION

One embodiment relates to a system for installation in a vehicle and for controlling a remote device including a trainable transceiver, a camera, an output device, and a control circuit coupled to the trainable transceiver and the camera. The control circuit is configured to use data received from the camera to determine if the vehicle is well positioned within a garage, and the control circuit is configured to provide an indication that the vehicle is well positioned using the output device in response to determining that the vehicle is well positioned within a garage.

Another embodiment relates to a method for positioning a vehicle within a garage using a trainable transceiver and a camera in coupled to the trainable transceiver. The method includes receiving, at a control circuit of the trainable transceiver, image data from the camera and determining if the vehicle is well positioned within the garage based on the image data. The method further includes providing an indication that the vehicle is well positioned garage using an output device of the trainable transceiver controlled by the control circuit, in response to determining that the vehicle is well positioned within a garage.

Another embodiment relates to a system for installation in a vehicle and for controlling a remote device including a trainable transceiver, a camera interface configured to receive images through a wired or wireless connection with one or more cameras located in or on the vehicle, an output device, and a control circuit coupled to the trainable transceiver and the camera interface. The control circuit is configured to use data received from the camera to determine if the vehicle is well positioned within a garage and to provide an indication via the output device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION

FIG. 2C illustrates an embodiment of a trainable transceiver in communication with a vehicle electronics system.

FIG. 5A illustrates an exemplary embodiment of a control scheme for a trainable transceiver to control multiple devices using a combination of cameras and positioning information.

FIG. 5B illustrates an exemplary embodiment of a control scheme for a trainable transceiver to control multiple devices using cameras.

FIG. 6A illustrates a trainable transceiver having three input buttons according to an exemplary embodiment.

FIG. 6B illustrates a trainable transceiver having a multiple channel button.

DETAILED DESCRIPTION

Figure 1:
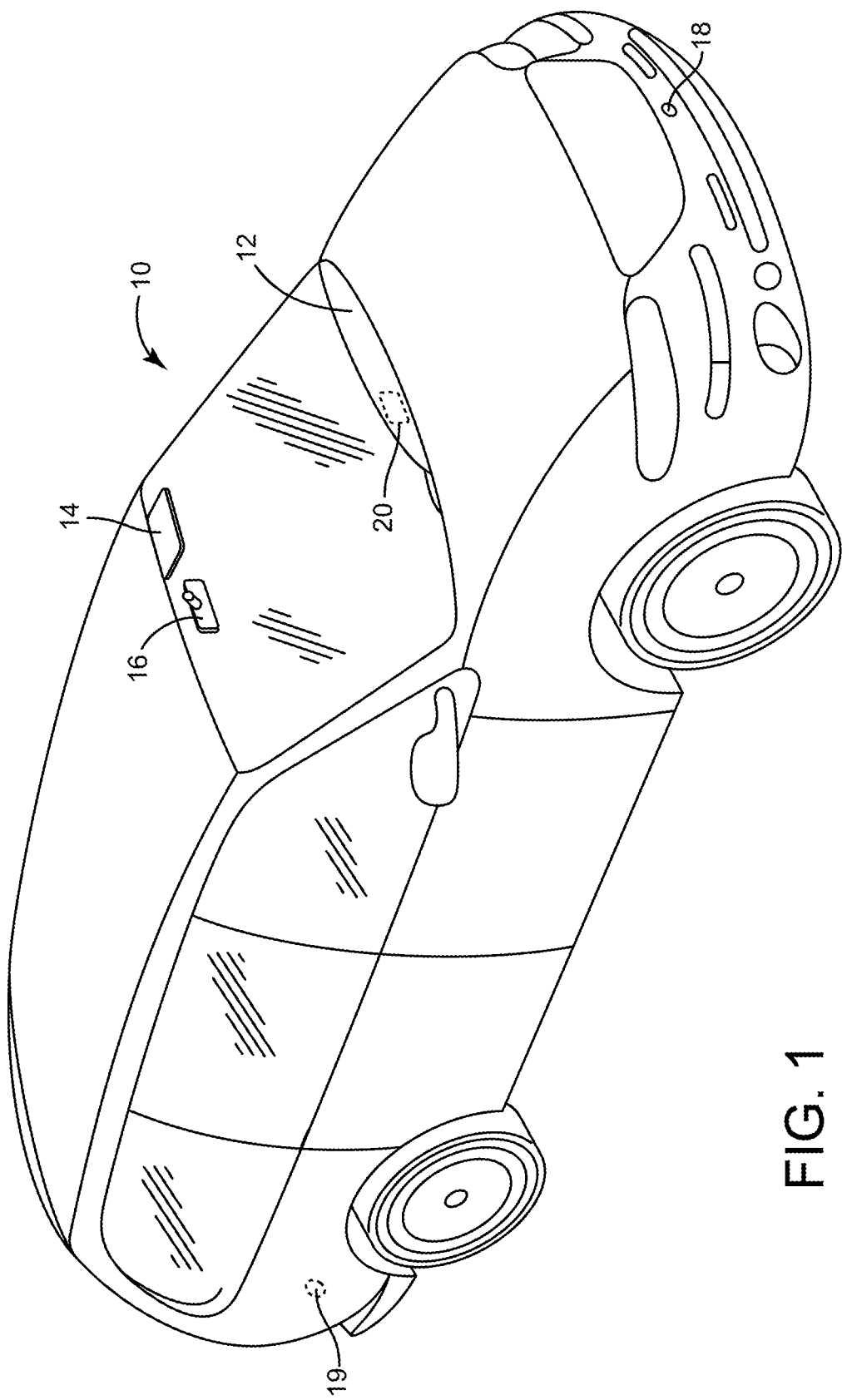
FIG. 1 illustrates a vehicle including a camera and a plurality of locations for a trainable transceiver according to an exemplary embodiment.

Generally, a trainable transceiver controls one or more home electronic devices and/or remote devices. For example, the trainable transceiver may be a Homelink™ trainable transceiver. Home electronic devices may include devices such as a garage door opener, gate opener, lights, security system, and/or other device which is configured to receive activation signals and/or control signals. A home electronic device need not be associated with a residence but can also include devices associated with businesses, government buildings or locations, or other fixed locations. Remote devices may include mobile computing devices such as mobile phones, smartphones, tablets, laptops, computing hardware in other vehicles, and/or other devices configured to receive activation signals and/or control signals.

Activation signals may be wired or, preferably, wireless signals transmitted to a home electronic device and/or remote device. Activation signals may include control signals, control data, encryption information (e.g., a rolling code, rolling code seed, look-a-head codes, secret key, fixed code, or other information related to an encryption technique), or other information transmitted to a home electronic device and/or remote device. Activation signals may have parameters such as frequency or frequencies of transmission (e.g., channels), encryption information (e.g., a rolling code, fixed code, or other information related to an encryption technique), identification information (e.g., a serial number, make, model or other information identifying a home electronic device, remote device, and/or other device), and/or other information related to formatting an activation signal to control a particular home electronic device and/or remote device.

In some embodiments, the trainable transceiver receives information from one or more home electronic devices and/or remote devices. The trainable transceiver may receive information using the same transceiver user to send activation signals and/or other information to home electronic devices and/or remote devices. The same wireless transmission scheme, protocol, and/or hardware may be used from transmitting and receiving. The trainable transceiver may have two way communication with home electronic devices and/or remote devices. In other embodiments, the trainable transceiver includes additional hardware for two way communication with devices and/or receiving information from devices. In some embodiments, the trainable transceiver has only one way communication with a home electronic device and/or remote device (e.g., sending activation signals to the device). The trainable transceiver may receive information about the home electronic device and/or remote device using additional hardware. The information about the home electronic device and/or remote device may be received from an intermediary device such as an additional remote device and/or mobile communication device.

A trainable transceiver may also receive information from and/or transmit information to other devices configured to communicate with the trainable transceiver. For example, a trainable transceiver may receive information from cameras (e.g., imaging information may be received) and/or other sensors. The cameras, and the information received therefrom, may assist in the training and/or operation of the trainable transceiver.

The cameras and/or other sensors may communicate with a trainable transceiver wirelessly (e.g., using one or more transceivers) or through a wired connection. In some embodiments, a trainable transceiver may communicate with mobile communications devices (e.g., cell phones, tablets, smartphones, or other communication devices). In still further embodiments, the trainable transceiver is configured to communicate with networking equipment such as routers servers, switches, and/or other hardware for enabling network communication. The network may be the internet and/or a cloud architecture.

In some embodiments, the trainable transceiver transmits and/or receives information (e.g., activation signals, control signals, control data, status information, or other information) using a radio frequency signal. For example, the transceiver may transmit and/or receive radio frequency signals in the ultra-high frequency range, typically between 260 and 960 megahertz (MHz) although other frequencies may be used. In other embodiments, a trainable transceiver may include additional hardware for transmitting and/or receiving signals (e.g., activation signals and/or signals for transmitting and/or receiving other information). For example, a trainable transceiver may include a light sensor and/or light emitting element, a microphone and/or speaker, a cellular transceiver, an infrared transceiver, or other communication device.

A trainable transceiver may be configured (e.g., trained) to send activation signals and/or other information to a particular device and/or receive control signals and/or information from a particular device. The trainable transceiver may be trained by a user to work with particular remote devices and/or home electronic devices (e.g., a garage door opener). For example, a user may manually input control information into the trainable transceiver to configure the trainable transceiver to control the device. A trainable transceiver may also learn control information from an original transmitter. A trainable transceiver may receive a signal containing control information from an original transmitter (e.g., a remote sold with a home electronic device) and determine control information from the received signal. Training information (e.g., activation signal frequency, device identification information, encryption information, modulation scheme used by the device, or other information related to controlling a device via an activation signal) may also be received by a trainable transceiver from a remote device, mobile communications device, or other source.

Referring to FIG. 1, a trainable transceiver 20 may be mounted or otherwise attached to a vehicle 10 in a variety of locations. For example, the trainable transceiver 20 may be integrated into a dashboard or center stack (e.g., infotainment center) 12 of the vehicle 10. The trainable transceiver 20 may be integrated into the vehicle 10 by a vehicle manufacturer. A trainable transceiver may be located in other peripheral locations. For example, a trainable transceiver may be removably mounted to a visor 14. The trainable transceiver may include mounting hardware such as a clip. A trainable transceiver may be mounted to other surfaces of a vehicle (e.g., dashboard, windshield, door panel, or other vehicle component). For example, a trainable transceiver may be secured with adhesive. In some embodiments, a trainable transceiver is integrated in a rear view mirror 16 of the vehicle. A vehicle manufacturer may include a trainable transceiver in the rear view mirror.

In other embodiments, a vehicle 10 may be retrofit to include a trainable transceiver 20. This may include attaching a trainable transceiver 20 to a vehicle surface using a clip, adhesive, or other mounting hardware as described above. Alternatively, it may include replacing a vehicle component with one that includes an integrated trainable transceiver 20 and/or installing a vehicle component which includes an integrated trainable transceiver 20. For example, an aftermarket rear view mirror, vehicle camera system (e.g., one or more cameras and one or more display screens), and/or infotainment center may include an integrated trainable transceiver 20. In further embodiments, one or more components of a trainable transceiver 20 may be distributed within the vehicle 10.

Still referring to FIG. 1, the vehicle 10 may include one or more cameras. The trainable transceiver 20 may communicate with one or more cameras 18 and 19 of the vehicle 10. The camera may be included in the vehicle 10 for tasks such as providing a backup camera system, recording traffic incidents or other footage related to the vehicle, providing security, monitoring and/or measuring a vehicle's surrounding, and/or performing other camera related functions. Cameras may be installed by a vehicle manufacturer and/or be produced by an original equipment manufacturer. In other embodiments, cameras may be installed as an aftermarket addition to a vehicle. In some embodiments, the vehicle 10 may include a front facing camera 18 and/or a rear facing camera 19. A vehicle may include additional cameras. For example, a vehicle may include a plurality of rear facing cameras 19, a plurality of front facing cameras 18, cameras facing either side of the vehicle 10, cameras facing the below and/or above the vehicle 10, cameras facing the interior of the vehicle 10, and/or cameras located in other areas of the vehicle 10 internal and/or external to the vehicle 10 and viewing an internal portion of the vehicle 10 and/or viewing outside of and/or around the vehicle 10.

In some embodiments, the trainable transceiver 20 may communicate with cameras located in or on another vehicle, cameras mounted in or on a structure (e.g., a garage, home, office, and/or other building). In some embodiments, cameras may be integrated with vehicle 10 components. For example, a camera may be integrated with a rear view mirror.

Communication with the cameras 18 or 19 may allow the trainable transceiver 20 to perform a variety of tasks associated with controlling a home electronics device, remote device, vehicle remote stain system, and/or other devices. For example, the cameras 18 or 19 may be used by the trainable transceiver 20 to identify a device (e.g., to be activated or trained-to) and format an activation signal to control that device. The cameras 18 or 19 may be used by the trainable transceiver 20 to determine if the vehicle 10 is well positioned within a garage and prevent a garage door opener from dosing a garage door that would come into contact with the vehicle 10. The cameras 18 or 19 may be used to determine if a garage door is closed when the vehicle 10 is remote started and provide this information to the trainable transceiver 20 which may control the garage door opener and cause the garage door to be opened. Other functions as described herein may enhance the functionality of the trainable transceiver 20 by making use of a camera and/or other hardware or devices Referring now to FIG. 2A, the components of the trainable transceiver 20 are illustrated according to an exemplary embodiment. In one embodiment, the trainable transceiver 20 includes an operator input device 22. The operator input device 22 may be one or more buttons. For example, the operator input device may be three hard key buttons. In some embodiments, the operator input device 22 may include input devices such as touchscreen displays, switches, microphones, knobs, touch sensor (e.g., projected capacitance sensor resistance based touch sensor, resistive touch sensor, or other touch sensor), proximity sensors (e.g., projected capacitance, infrared, ultrasound, infrared, or other proximity sensor), or other hardware configured to generate an input from a user action.

The operator input device 22 may display data to a user or other provide outputs. For example, the operator input device 22 may include a display screen (e.g., a display as part of a touchscreen, liquid crystal display, e-ink display, plasma display, light emitting diode (LED) display, or other display device), speaker, haptic feedback device (e.g., vibration motor), LEDs, or other hardware component for providing an output.

The operator input device 22 is connected to a control circuit 24. The control circuit 24 may receive input signals, instructions, and/or data from the operator input device. The control circuit 24 may process signals received from the operator input device 22. The control circuit 24 may also send information and or control signals or instructions to the operator input device 22. For example, the control circuit 24 may send output instructions to the operator input device 22 causing the display of an image.

The control circuit 24 may include various types of control circuitry, digital and/or analog, and may include a microprocessor, microcontroller, application-specific integrated circuit (ASIC), graphics processing unit (GPU), or other circuitry configured to perform various input/output, control, analysis, and other functions to be described herein. In other embodiments, the control circuit may be a SoC individually or with additional hardware components described herein. The control circuit 24 may further include, in some embodiments, memory (e.g., random access memory, read only memory, flash memory, hard disk storage, flash memory storage, solid state drive memory, etc.). In further embodiments, the control circuit 24 may function as a controller for one or more hardware components included in the trainable transceiver. For example, the control circuit 24 may function as a controller for a touchscreen display or other operator input device, a controller for a transceiver, transmitter, receiver, or other communication device (e.g., implement a Bluetooth communications protocol).

The control circuit 24 is coupled to memory 26. Memory 26 may be used to facilitate the functions of the trainable transceiver described herein. Memory 26 may be volatile and/or non-volatile memory. For example, memory 26 may be random access memory, read only memory, flash memory, hard disk storage, flash memory storage, solid state drive memory, etc. In some embodiments, the control circuit 24 reads and writes to memory 26. Memory 26 may include computer code modules, data, computer instructions, or other information which may be executed by the control circuit 24 or otherwise facilitate the functions of the trainable transceiver 20 described herein. For example, memory 26 may include encryption codes, pairing information, identification information, a device registry, encryption instructions, training instructions, or other data or instructions configured to provide the activities noted herein.

The trainable transceiver may further include a transceiver circuit 28 coupled to the control circuit 24. The transceiver circuit 28 allows the trainable transceiver 20 to transmit and/or receive wireless communication signals. The wireless communication signals may be transmitted to or received from a variety of wireless devices (e.g., original transmitter 40, home electronic device 42, mobile communications device 44, and/or remote device 46). The transceiver circuit 28 may be controlled by the control circuit 24. For example, the control circuit 24 may turn on or at the transceiver circuit 28; the control circuit may send data using the transceiver circuit 28, format information, an activation signal, control signal, and/or other signal or data for transmission via the transceiver circuit 28, or otherwise control the transceiver circuit 28. Inputs from the transceiver circuit 28 may also be received by the control circuit 24. In some embodiments, the transceiver circuit 28 may include additional hardware such as processors, memory, integrated circuits, antennas, etc. The transceiver circuit 28 may process information prior to transmission or upon reception and prior to passing the information to the control circuit 24. In some embodiments, the transceiver circuit 28 may be coupled directly to memory 26 (e.g., to store encryption data, retrieve encryption data, etc.). In further embodiments, the transceiver circuit 28 may include one or more transceivers, transmitters, receivers, etc. For example, the transceiver circuit 28 may include an optical transceiver, near field communication (NFC) transceiver, etc. In some embodiments, the transceiver circuit 28 may be implemented as a SoC (e.g., incorporating all or a plurality of the components shown in FIG. 2A).

When the control circuit 24 receives inputs from operator input devices 22 and processes the inputs, the inputs may be converted into control signals, data, inputs to be sent to the base station, or otherwise processed. The control circuit 24 may control the transceiver circuit 28 and use the transceiver circuit 28 to communicate (e.g., receive signals and/or transmit signals) with one or more of original transmitters 40, home electronic devices 42, mobile communication devices 44, and/or remote devices 46. The control circuit 24 may also be used to in the training process.

In further embodiments, the control circuit 24 is coupled to additional transceiver circuits, receivers, and/or transmitters. In one embodiment, the transceiver circuit 28 is used for communicating with (transmitting to and/or receiving from) home electronic devices and/or remote devices. Additional transceivers may be used to communicate with other devices (e.g., mobile communications devices, cameras, network devices, or other wireless devices). The transceiver circuit 28 and other transceivers may operate using different frequency, transmission spectrums, protocols, and/or otherwise transmit and/or receive signals using different techniques. For example, the transceiver circuit 28 may be configured to send activation signals to a home electronic device 42 (e.g., a garage door opener) using an encrypted radio wave transmission and an additional transceiver may communicate with a remote communications device 46 (e.g., a smartphone) using a Bluetooth transceiver and Bluetooth communications protocol.

The trainable transceiver 20 may communicate with original transmitters 40, home electronic devices 42, remote devices 46, mobile communications devices 44, network devices, and/or other devices as described above using the transceiver circuit 28 and/or other additional transceiver circuits or hardware. The devices with which the trainable transceiver 20 communicates may include transceivers, transmitters, and/or receivers. The communication may be one-way or two-way communication.

In one alternative embodiment, the trainable transceiver 20 is a distributed system. A remote user interface module may contain operator input devices, a power source, a control circuit, memory, output devices, and/or communications hardware. The remote user interface module may communicate with a base station located apart from the remote user interface module. For example, the remote user interface module may include a transceiver used to communicate with the base station. The base station may communicate with the remote user interface module using a transceiver circuit and/or an additional transceiver such as those discussed above. The remote user interface module may process user inputs and send information to a base station with a transceiver circuit configured to send an activation signal and/or other signal to another device. The base station may include a more powerful (e.g., longer range) transceiver than the transceiver(s) in the remote user interface module.

In some embodiments, the remote user interface module may contain a transceiver configured to allow communication between the remote user interface module and another device such as a remote device and/or mobile communications device. The remote user interface module may serve as a communication bridge between a remote device or mobile communications device and another device such as the base station or a home electronics device or remote device in communication with the base station.

Figure 2A:
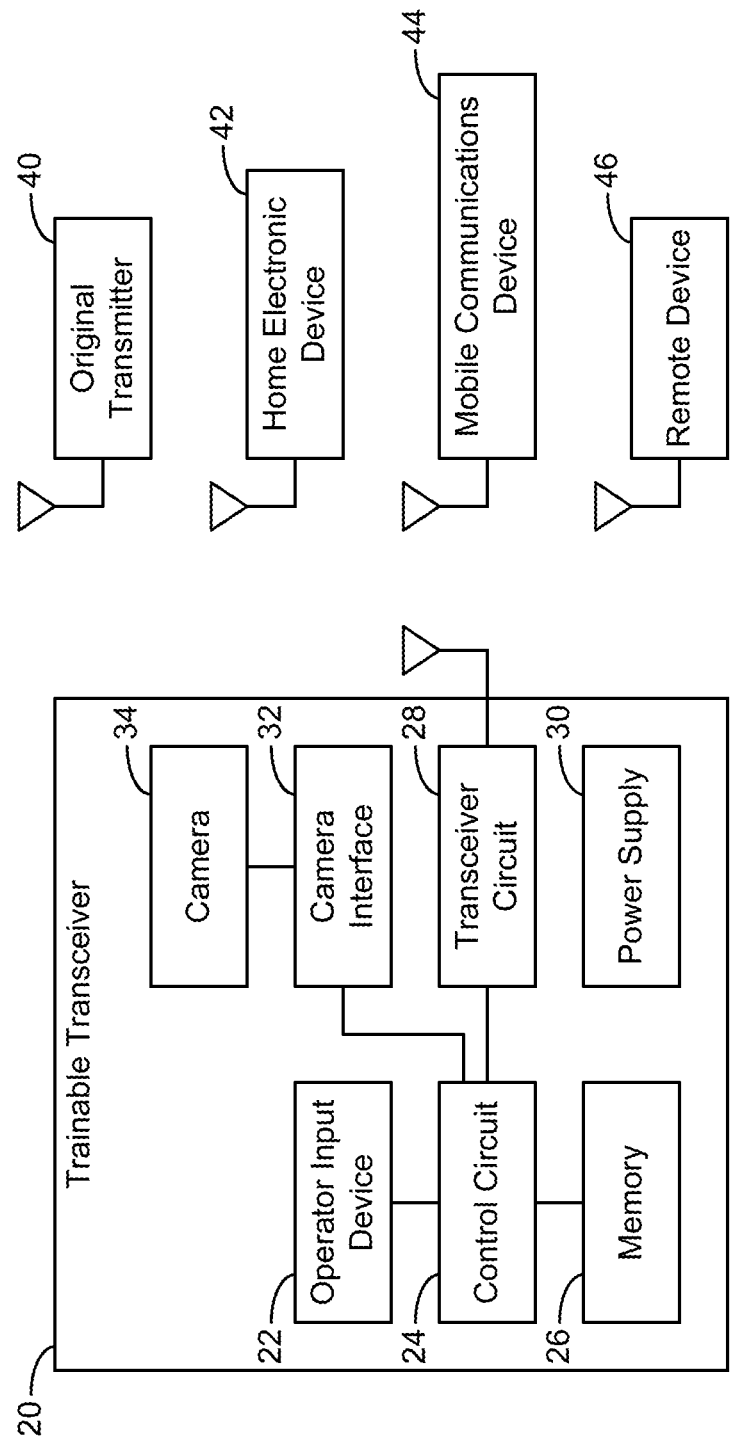
FIG. 2A illustrates a trainable transceiver, mobile communications device, original transmitter, home electronic device, and remote device according to an exemplary embodiment.

With continued reference to FIG. 2A, the trainable transceiver 20 may include a power supply 30. The power supply 30 provides electrical power to the components of the trainable transceiver 20. In one embodiment, the power supply 30 is self-contained. For example, the power supply 30 may be a battery, solar cell, or other power source not requiring a wired connection to another source of electrical power. In other embodiments, the power supply 30 may be a wired connection to another power source. For example, the power supply 30 may be a wired connection to a vehicle power supply system. The power supply 30 may be integrated into the vehicle electrical system. This may allow the trainable transceiver 20 to draw electrical power from a vehicle battery, be turned on or off by a vehicle electrical system (e.g., turned off when the vehicle is turned off, turned on when a vehicle door is opened, etc.), draw power provided by a vehicle alternator, or otherwise be integrated with the electrical power systems(s) of the vehicle 10.

The trainable transceiver 20 may also include one or more camera interfaces 32. The camera interface 32 may include hardware components for interfacing with one or more cameras 34. For example, the camera interface 32 may include wiring, multiplexing circuitry, connectors, ports (e.g., universal serial bus (USB) ports, high-definition multimedia interface (HDMI) ports, video graphics array (VGA) ports, and/or other connections), buses, wireless communication hardware, and/or other components which allow one or more cameras 34 to communicate with trainable transceiver 20. Camera interface 32 allows for communication between onboard cameras 34 and control circuit 24. Camera interface 32 may further or alternatively provide communication between remotely located cameras 34 and trainable transceiver 20. In some embodiments, the camera interface 32 includes hardware and/or software for handling camera input (e.g., image data), processing camera input, and/or generating output to one or more cameras 34 (e.g., control information). For example, the camera interface 32 may include circuitry, microprocessor, microcontroller, application-specific integrated circuit (ASIC), graphics processing unit (GPU), or other circuitry configured to perform various input/output, control, processing, and other functions to be described herein. In other embodiments, the camera interface 32 may be a SoC individually or with additional hardware components described herein. The camera interface 32 may further include, in some embodiments, memory (e.g., random access memory, read only memory, flash memory, hard disk storage, flash memory storage, solid state drive memory, etc.). In further embodiments, the camera interface 32 may be a controller for one or more cameras 34.

In some embodiments, the camera interface 32 is integral to and/or part of the control circuit 24. The control circuit 24 may perform the functions described herein with reference to the camera interface 32. In other embodiments, the camera interface 32 may be or be replaced by one or more cameras or sensors coupled to the control circuit 24. For example, cameras 34 may provide input to the control circuit 24 and/or receive outputs from the control circuit 24 directly without a camera interface 32 or other intermediate hardware components.

Input received by the camera interface 32 and/or control circuit 24 may include a frame buffer, sensor, data, image information, camera identification information (e.g., which camera front, rear, side, etc. is associated with the camera output), and/or other information and/or data output from one or more cameras. Input may be processed using algorithms stored in memory 26 and or processing circuits or elements such as those described above. Processing of information from one or more cameras (e.g., onboard cameras or remotely located cameras) may include digital imaging processing and/or digital signal analysis. This may include classification, feature extraction, pattern recognition, multi-scale signal analysis, reading a machine readable representation and/or other use of algorithms and/or programs to process information from one or more cameras. In one embodiment, the camera interface 32 performs image processing. In other embodiments, image processing is performed by the control circuit 24.

The control circuit 24 and/or camera interface 32 may also provide output to one or more cameras directly or through the camera interface 32. Output may include control signals for turning on or off a camera, switching between camera inputs, focusing a camera, and/or otherwise controlling one or more cameras connected to the trainable transceiver 20. Output from the control circuit 24 and/or camera interface 32 may also include a frame buffer, image file, image data, camera identification information, and/or other information related to the input received from one or more cameras. For example, an image may be output to a display in communication with the trainable transceiver 20 and/or integrated into the trainable transceiver 20. The trainable transceiver 20 may transmit image information (e.g., an image file, frame buffer(s), etc.) to one or more devices in communication with the trainable transceiver 20. For example, the trainable transceiver 20 may transmit an image to a home electronic device 42, remote device 46, mobile communication device 44, network device, and/or other device configured to receive transmissions from the trainable transceiver 20.

Figure 2B:
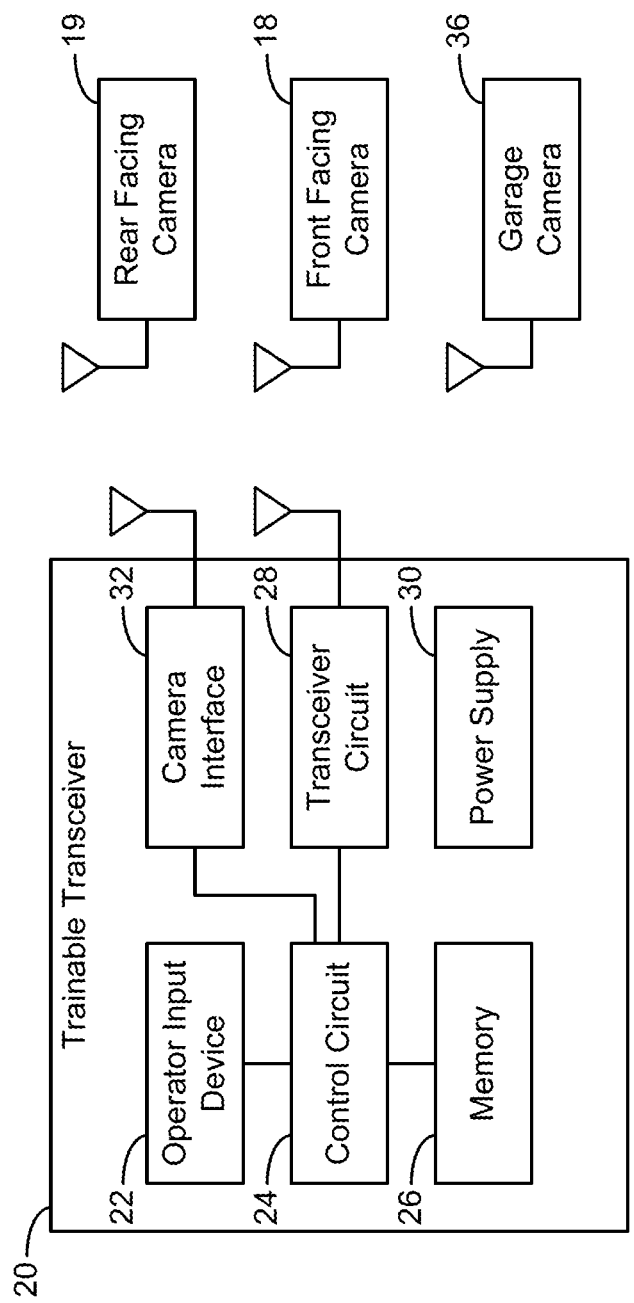
FIG. 2B illustrates an embodiment of a trainable transceiver having a camera interface for communicating with a camera.

Referring now to FIG. 2B, the camera interface 32 may communicate wirelessly with one or more cameras associated with the vehicle 10, such as the front facing camera 18, the rear facing camera 19, or a garage camera 36. In some embodiments, the camera interface 32 includes or is a wireless receiver or transceiver configured to communicate wirelessly with one or more cameras. For example, the camera interface 32 may include a radio frequency transceiver (e.g., configured to operate at a specific frequency such as 2.4 GHz), and the cameras may include a radio frequency transceiver. The radio frequency transmissions between the camera and the camera interface 32 may be encrypted or otherwise secured. In other embodiments, the camera and the camera interface 32 may communicate using other protocols, transmission spectra, and/or communication hardware. For example, the camera interface 32 may include or be a wireless router and the cameras may be internet protocol cameras.

Referring now to FIG. 2C, a trainable transceiver is illustrated, according to an exemplary embodiment, including a connection to a vehicle electronics system 50 including one or more cameras (e.g., front facing camera 18 and rear facing camera 19). The vehicle electronics system 50 may include processors 52 (e.g., electronic control units (ECU), engine control modules (ECM), or other vehicle processors), memory 54, buses (e.g., controller area network (CAN) bus, sensors, on-board diagnostics equipment (e.g., following the (OBD)-II standard or other protocol), cameras, displays, infotainment systems, transceivers, and/or other components integrated with a vehicle's electronics systems 50 or otherwise networked (e.g., a controller area network of vehicle components). In one embodiment, the camera interface 32 of the trainable transceiver 20 is in communication with the CAN bus of the vehicle. Communication with the CAN bus of the vehicle may provide for the trainable transceiver 20 access to the front facing camera 18, the rear facing camera 19, and/or other camera integrated with the vehicle electronic system 50. The camera interface 32 and/or control circuit 24 may retrieve image data from the cameras, control the cameras, and/or otherwise interact with the cameras. In some embodiments, components of the vehicle electronics system 50 may process (e.g., using one or more vehicle processors 52) data or information form one or more cameras (e.g., garage camera 36, rear facing camera 19, from facing camera 18, camera 38, etc.). For example, the vehicle electronics system 50 may create a frame buffer, image file, or other image data based on input received by one or more onboard cameras (e.g., rear facing camera 19, from facing camera 18, etc.). In one embodiment, the camera interface 32 and/or control circuit 24 of the trainable transceiver 20 receives processed data or information related to the cameras from the vehicle electronics system 50. For example, the camera interface 32 may read frame buffer data from memory 54 included in the vehicle electronics system 50.

In some embodiments, the trainable transceiver 20 receives information related to a located outside the vehicle. For example, a camera or cameras 36 may be located in a garage. In some embodiments, cameras are configured to transmit images and/or image information to a garage door opener 56. For example, cameras 36 may be in wireless communication with the garage door opener 56. Alternatively, cameras 36 may be wired to the garage door opener 56 and provide images and/or image data to the garage door opener 56 through wired communication. In some embodiments, the garage door opener 56 may include an integral camera or camera otherwise coupled to the garage door opener 56 (e.g., mounted on the garage door opener 56 and in communication with the garage door opener 56). The garage door opener 56 may in turn provide images and/or image data to the trainable transceiver 20 by sending a wireless signal using a transceiver. The wireless signal may be received by the transceiver circuit 28 of the trainable transceiver 20. In other embodiments, the garage door opener 56 may communicate with the trainable transceiver 20 using one or more intermediary devices and/or additional hardware.

Images and/or image data may be transmitted from a camera and/or device coupled to a camera using intermediate devices and/or hardware. In one embodiment, the cameras are internet protocol (IP) cameras and/or the garage door opener 56 includes hardware to connect to the internet (e.g., a networking device allowing wired or wireless communication with network equipment such as a router, switch, modem, or other device). In other embodiments, the cameras 36 or garage door opener 56 include a wireless transceiver such as a radio frequency transceiver, Bluetooth transceiver, cellular transceiver, or other communications device. The above described hardware may allow the cameras 36 and/or the garage door opener 36 to transmit images and/or image data for reception by the trainable transceiver 20.

In some embodiments, the images and/or image data are received by an intermediate device other than the trainable transceiver 20 which then communicates the images and/or image data to the trainable transceiver 20. For example, the images and/or image data may be received by a mobile communications device using a cellular transceiver and/or internet access. The images and/or image data may then by communicated to the trainable transceiver 20 using the transceiver circuit 28 or an additional transceiver such as a Bluetooth transceiver. Alternatively, the images and/or image data may be received by a mobile communications device and transmitted to a vehicle electronics system 50 (e.g., a smartphone may be paired to a vehicle infotainment system and communicate using a Bluetooth protocol). The information received by the infotainment system may be accessed by the trainable transceiver 20 using a connection to the vehicle electronics system 50 (e.g., a camera interface 32 or other hardware). In further embodiments, a remote device may be used to receive the images and/or image data and transmit it to the trainable transceiver 20. Similarly, the images and/or image data may be received by a vehicle using a cellular transceiver and/or internet connection and the information accessed by the trainable transceiver 20 through a connection to the vehicle electronics system 50. In alternative embodiments, the trainable transceiver 20 may include a transceiver for directly receiving images and/or image data from a camera, device coupled to a camera, or an intermediate device. For example, the trainable transceiver 20 may include a cellular transceiver and/or connection to the internet allowing for wireless communication with a camera, device coupled to a camera, or an intermediate device.

In some embodiments, a home electronic device 42 is a camera, security system, or other device coupled to or including a camera 38. For example, a security system may include one or more cameras and/or IP cameras. The security system may be configured to communicate with or connect to the Internet. In some embodiments, the security system may include hardware for wireless communication such as a radio frequency transceiver, cellular transceiver, or other device. Home electronic devices 42 may include gate openers coupled to one or more cameras 38, lighting systems with light sensors and/or cameras, etc. The home electronic device 42 may provide images and/or image data received from one or more cameras 38 to the trainable transceiver 20 by sending a wireless signal using a transceiver. The wireless signal may be received by the transceiver circuit 28 of the trainable transceiver 20. In other embodiments, the home electronic device 42 may communicate with the trainable transceiver 20 using one or more intermediary devices and/or additional hardware. The home electronics device 42 may communicate with the trainable transceiver 20 using any of the techniques described above with reference to the garage door opener 56.

A camera included in or otherwise in communication (e.g., wired or wireless access to image data from a camera) with a remote device and/or mobile communications device may provide images and/or image data to the trainable transceiver using communication hardware incorporated in the coupled device. In some embodiments, a remote device and/or mobile communications device is coupled to or includes a camera. For example, a laptop, smartphone, tablet, game console, webcam, desktop computer, or other device may include an integrated camera and/or be coupled to a camera. Remote devices and/or mobile communications devices may communicate images and/or image data to the trainable transceiver 20. In some embodiments, remote devices and/or mobile communication devices include a transceiver which allows for communication with the trainable transceiver 20 (e.g., using the transceiver circuit 28 or an additional transceiver of the trainable transceiver 20). In other embodiments, remote devices and/or mobile communications devices communicate with the trainable transceiver 20 using one or more intermediate devices and/or additional hardware. A home electronics device 42 (e.g., a remote device) may communicate with a trainable transceiver 20 using any of the techniques described above with reference to a garage door opener.

Communication between the trainable transceiver 20, a camera, and/or intermediate devices and/or hardware, as described above, may be unidirectional or bidirectional. For example, the trainable transceiver 20 may send a request for images and/or image data to a camera and/or intermediate device. The camera and/or intermediate device may then send the requested information to the trainable transceiver 20 directly or through an intermediate device. Alternatively, the communication between the trainable transceiver 20 and the camera and/or intermediate device may be unidirectional as regards images and/or image data. For example, the trainable transceiver 20 may send an activation signal, control signal, and/or other information to a device using the transceiver circuit 28 without including a request for images and/or image data. A home electronics device, remote device, network device, and/or mobile communications device may be programed to transmit images and/or image data in response to an action triggered by the activation or other signal and/or in response to receiving an activation other signal. The trainable transceiver 20 may receive images and/or image data using one or more of the above described techniques.

Figure 2D:
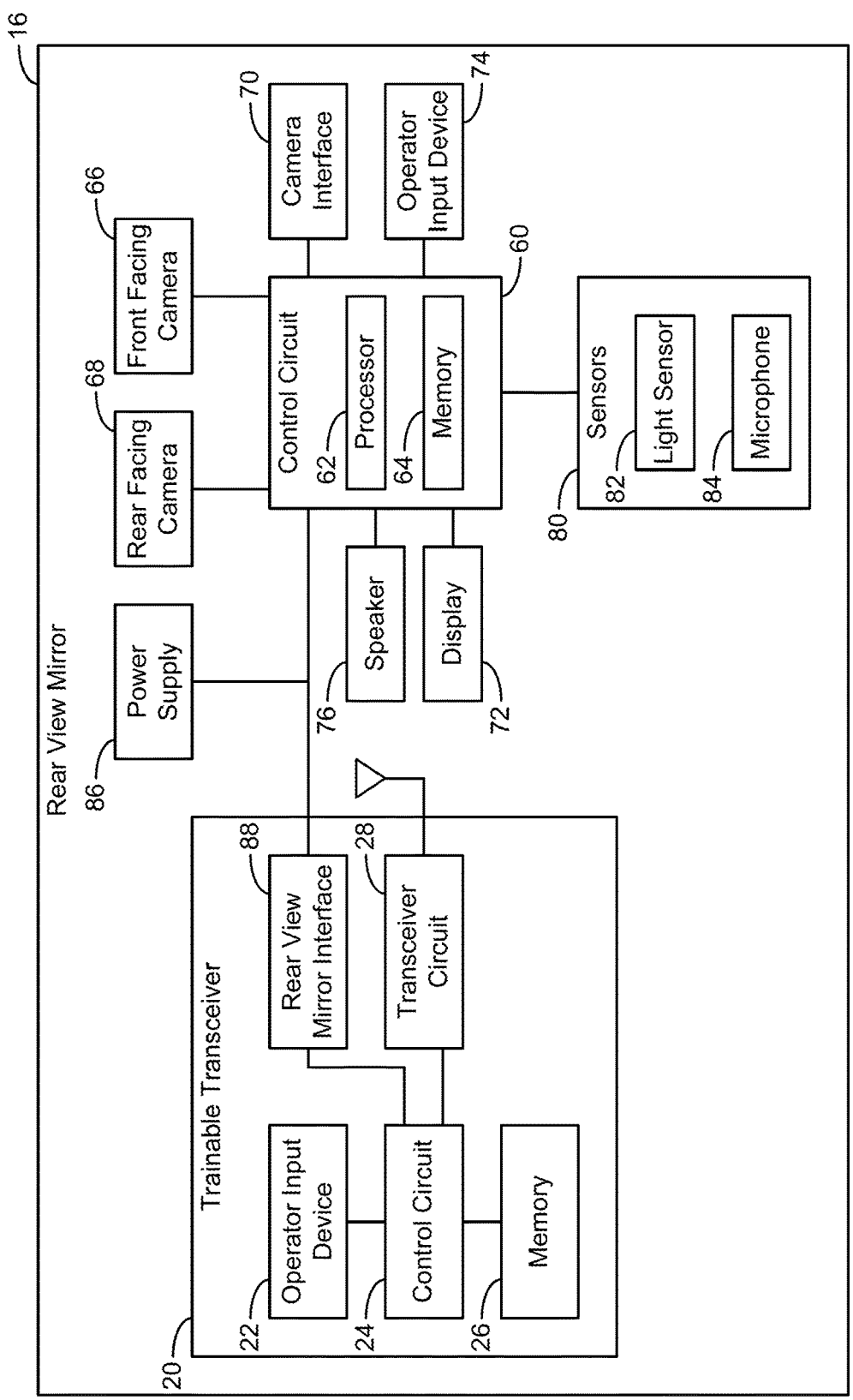
FIG. 2D illustrates a trainable transceiver coupled to a rear view mirror of a vehicle according to an exemplary embodiment.

Referring now to FIG. 2D, a trainable transceiver coupled to rear view mirror hardware is illustrated according to exemplary embodiment. The trainable transceiver 20 may be coupled to or otherwise included in the rear view mirror 16. Advantageously, this may allow the trainable transceiver 20 to use hardware associated with the rear view mirror 16 rather than duplicating the same hardware for use with the trainable transceiver 20. This may save cost, simplify the manufacturing process, and/or otherwise improve the trainable transceiver system 20. The rear view mirror 16 may be installed in the vehicle 10 as part of an original vehicle manufacturing process, as an additional piece of hardware, as part of a retrofit instillation, to replace an existing mirror, or otherwise be added to the vehicle 10. The rear view mirror 16 may be uninstalled in the vehicle (e.g., packaged for sale for later installation in the vehicle 10).

In one embodiment, the rear view mirror 16 includes a control circuit 60. The control circuit 60 may contain circuitry, hardware, and/or software for facilitating and/or performing the functions described herein. The control circuit 60 may handle inputs, process inputs, run programs, handle instructions, route information, control memory, control a processor, process data, generate outputs, communicate with other devices or hardware, and/or otherwise perform general or specific computing tasks. In some embodiments, the control circuit 60 includes a processor 62. The processor 62 may be implemented as a general-purpose processor, an application specific integrated circuit (ASIC), one or more field programmable gate arrays (FPGAs), a digital-signal-processor (DSP), a group of processing components, or other suitable electronic processing components.

In some embodiments, the control circuit includes memory 64. Memory 64 is one or more devices (e.g. RAM, ROM, Flash Memory, hard disk storage, etc.) for storing data and/or computer code for facilitating the various processes described herein. Memory 64 may be or include non-transient volatile memory or non-volatile memory. Memory 64 may include database components, object code components, script components, or any other type of information structure for supporting various activities and information structures described herein. Memory 64 may be communicably connected to the processor and provide computer code or instructions to processor for executing the processes described herein.

In some embodiments, the rear view mirror 16 includes one or more front facing cameras 66 and/or one or more rear facing cameras 68. The front facing camera 66 may be used alone or in conjunction with the control circuit 60 of the rear view mirror 16 to perform a variety of functions. For example, the front facing camera 66 may be used to provide driver aids such as automatically dimming headlights when oncoming cars are detected (e.g., by the headlights of the oncoming car), detecting if the vehicle 10 is in its own lane, detecting rain or other weather, detecting a possible collision with another vehicle or object, recognizing traffic signs (e.g., extracting information from an image including a traffic sign), detecting pedestrians, and/or otherwise assisting a driver. The rear facing camera 68 may be used alone or in conjunction with the control circuit 60 of the rear view mirror 16 to perform a variety of functions. For example, the rear facing camera 68 may be used as to determine when to dim the rear view mirror 16, as a backup camera, to detect objects behind the vehicle 10, to provide an image of the vehicle surroundings while reversing, and/or to otherwise assist a driver of the vehicle 10. In further embodiments, the rear view 16 mirror includes a camera which is positioned to record images of the interior of the vehicle 10. The rear view mirror 16 can contain circuits configured to use image information received at one or more cameras to complete and/or trigger the various activities (e.g., auto dimming, headlight adjustment, etc.) described in this paragraph.

In some embodiments, the front facing camera 66 is integrated with the housing or another portion of the rear view mirror 16. For example, the camera 66 may be located within the portion of the housing behind the mirror. Alternatively, the front facing camera 66 may be located in a portion of the rear view mirror housing which connects the mirror to the windshield and/or head liner. The camera 66 may be protected by the housing which contacts the windshield at locations surrounding the camera. The rear facing camera 68 may be integrated with the housing of the rear view mirror such that the rear facing camera has a line of sight to the rear window of the vehicle.

The front facing camera 66 and/or the rear facing camera 68 may be wired to a camera interface 70 in the rear view mirror 16 and/or wired to the control circuit 60 of the rear view mirror 16. In some embodiments, the camera interface 70 allows the rear view mirror 16 to receive images and/or image data from cameras remote to the rear view mirror 16. For example, the camera interface 70 may receive images and/or image data from a camera located on the front bumper of the vehicle, on the rear bumper of the vehicle, in a license plate frame, or other remote location. In some embodiments, the camera interface 70 receives images and/or image data via a wired connection with the camera remote to the rear view mirror 16. In other embodiments, the camera interface 70 receives images and/or image data wirelessly from one or cameras located remote from the rear view mirror 16. The camera interface 70 may include one or more wireless transceivers.

In one embodiment, the rear view mirror 16 includes a display 72. The display 72 allows for visual communication with a user. The display 72 may be configured to output a visual representation based on computer instructions, control signals, computer code, frame buffers, and/or other electronic signals or information. In some embodiments, the display 72 includes a graphics processing unit (GPU), controller, and/or other hardware to facilitate the handling of and display of graphics information. In other embodiments, the display 72 does not include hardware for processing images or image data. The display 72 may be any hardware configured to display images using the emission of light or another technique. For example, the display 72 may be a liquid crystal display, e-ink display, plasma display, light emitting diode (LED) display, or other display device. In some embodiments, the display 72 may be part of or otherwise integrated with a user input device 74 such as a touchscreen display (e.g., projected capacitance touchscreen, resistance based touchscreen, and/or touchscreen based on other touch sensing technology). The display 72 may be a touchscreen display. In some embodiments, the display 72 is controlled by the control circuit 60 of the rear view mirror 16. The display 72 may be used for functions such as displaying weather information, backup camera video feeds, warnings, compass heading, road information (e.g., current speed limit), navigation information, vehicle information (e.g., if a passenger is not wearing a seat belt), or information accessible by the vehicle and/or a vehicle connected device (e.g., paired smartphone). The display 72 may be located behind the glass of the mirror assembly itself. The display 72 may be used to display images, but, when not in use, function as part of the mirror allowing a user to see towards the rear of the vehicle.

In some embodiments, the rear view mirror 16 includes an operator input device 74. The operator input device 74 may allow a user to provide inputs to the control circuit of the rear view mirror. The operator input 74 device may include soft keys (touch screens, projected capacitance based buttons, resistance based buttons, etc.) and/or hard keys (e.g., buttons, switches knobs, etc.), microphones, and/or other hardware configured to accept user inputs. The operator input device 74 may allow a user to control functions associated with the rear view mirror 16 such as dimming, turning on or off auto dimming, placing an emergency call, etc. The operator input device 74 of the rear view mirror 16 is coupled to the control circuit 60 of the rear view mirror 16. The rear view mirror 16 may process inputs received from the operator input device 74 (e.g., change the display, dim the mirror, play a sound using the speaker, or otherwise take an action, process the input, and/or generate an output).

In some embodiments, the rear view mirror includes one or more speakers 76. Speakers 76 may provide audio output. The sound produced by the speaker 76 may be audible to an occupant within the vehicle 10. The speaker 76 provides audio output to an occupant for a variety of functions. For example, the speaker 76 may provide an audible output to convey a warning, a phone call, communication with service providers (e.g., emergency services, roadside assistance, or other telematics systems), confirmation of an input, instructions on using the rear view mirror, or other information.

The rear view mirror 16 may include one or more sensors 80. For example, the rear view mirror 16 may include light sensors 82, temperature sensors, accelerometers, humidity sensors, microphones 84, and/or other sensors. Sensors 80 may be used to display information to an occupant of the vehicle 10 (e.g., current weather conditions) using the display 72 of the rear view mirror 16 and/or other displays in the vehicle 10 (e.g., center stack display, gauge cluster display, heads up display (HUD), etc.). Sensors 80 may also be used to accept user input and/or measure parameters related to the vehicle 10. For example, the microphone 84 may be used to accept voice commands from an occupant of the vehicle 10. The accelerometer may be used to measure vehicle dynamics and/or accept physical inputs from a user moving, adjusting, coming into contact with, bumping, shaking, or otherwise manipulating the rear view mirror. Sensor data may be processed, received, sent to other hardware, and/or otherwise manipulated by the control circuit 60 of the rear view mirror 16.

In one embodiment, the rear view mirror 16 includes a power supply 86. The power supply 86 may be a replaceable or rechargeable battery. In other embodiments, the power supply 86 may be a connection to a vehicle electrical system. For example, the components of the rear view mirror 16 may draw electrical power from a CAN bus, vehicle battery, vehicle alternator, and/or other vehicle system to which the components of the rear view mirror 16 are electrically connected.

In other embodiments, the rear view mirror 16 includes an integral transceiver, such as a cellular transceiver, Bluetooth transceiver, etc., or a connection to a transceiver coupled to the vehicle in which the rear view mirror 16 is or will be mounted. Using this transceiver and/or additional hardware, the rear view mirror 16 may have or be capable of providing access to the interact and/or communication to other devices and/or hardware (e.g., using radio frequency transmissions).

In one embodiment, the trainable transceiver 20 includes a rear view mirror interface 88. The rear view mirror interface 88 may allow for communication between the trainable transceiver 20 and the control circuit 60 of the rear view mirror 16. In one embodiment, rear view mirror interface 88 includes physical connection such as ports, connectors, wiring, and/or other hardware used to create an electrical connection between the control circuit 24 of the trainable transceiver 20 and the control circuit 60 of the rear view mirror 16. In alternative embodiments, the control circuit 24 of the trainable transceiver 20 and the control circuit 60 of the rear view mirror 16 are directly connected (e.g., wired such that outputs from one control circuit are received as inputs at the other control circuit and/or vice versa). In further embodiments, the rear view mirror interface 88 may include and/or be implemented by computer programing, code, instructions, or other software stored in memory in the trainable transceiver 20 and/or rear view mirror 16. Advantageously, the connection between the trainable transceiver 20 and the rear view mirror 16 may allow for components of the rear view mirror 16 to serve two or more functions thus increasing the usefulness of these components, reducing cost, and/or eliminating the need for duplicate components to provide additional functions to the trainable transceiver 20. For example, the front facing camera 66 of the rear view mirror 16 may be used for functions such as automatically dimming the headlights (e.g., brights) of the vehicle 10 when the headlights of an oncoming vehicle are detected by the front facing camera 66 and/or control circuit 60. The front facing camera 66 may also be used for functions of the trainable transceiver 20 described in more detail with reference to later figures such as identifying a garage door opener.

The connection between the trainable transceiver 20 and the rear view mirror hardware may allow the trainable transceiver 20 to control the hardware included in the rear view mirror 16, send control signals and/or instructions to the control circuit 60 of the rear view mirror 16, receive images and/or image data from the camera(s) (e.g., cameras 66 and 68) included in the rear view mirror 16 (e.g., via the control circuit of the rear view mirror), receive control signals and/or instructions, receive sensor information from sensors 80 included in the rear view mirror 16 (e.g., via the control circuit 60 of the rear view mirror 16), and/or otherwise interact with the rear view mirror 16 and/or components thereof.

The trainable transceiver 20 may be configured to control, communicate, or otherwise operate in conjunction with the control circuit 60 of the rear view mirror 16 to facilitate and/or perform the functions described herein. In one embodiment, the trainable transceiver 20 communicates with the control circuit 60 of the rear view mirror through a rear view mirror interface 88. In other embodiments, the trainable transceiver 20 communicates with the control circuit 60 of the rear view mirror 16 directly (e.g., the control circuit 24 of the trainable transceiver 20 communicates with the control circuit 60 of the rear view mirror 16). The trainable transceiver 20 may communicate and/or control the control circuit 60 of the rear view mirror 16 using a variety of techniques. For example, the trainable transceiver 20 may communicate with the rear view mirror 16 through outputs from the trainable transceivers 20 received as inputs at the control circuit 60 of the rear view mirror 16, sending the rear view mirror 16 a location in memory 64 which contains information instructions, data, or other information which is read by the control circuit 60 of the rear view mirror 16, sending the control circuit 60 of the rear view mirror 16 data, instructions, or other information through a bus, port, or other connection, or otherwise providing instructions, data, or information to the control circuit 60 of the rear view mirror 16.

In some embodiments, the control circuit 60 of the rear view mirror 16 communicates with the control circuit 24 of the trainable transceiver 20 using the same of similar techniques. In other embodiments, the communication is one way with the trainable transceiver 20 sending instructions, data, or other information to the control circuit 60 of the rear view mirror 16. The trainable transceiver 20 may extract data, instructions, or other information from the control circuit 60 of the rear view mirror 16 by reading the memory 64 of the rear view mirror 16 and/or requesting from the control circuit 60 of the rear view mirror 16 an address for a location in memory 64 in which the relevant information can be read. Alternatively, the control circuit 60 of the rear view mirror 16 may send information to the trainable transceiver 20 but only when requested by the trainable transceiver 20.

In some embodiments, the trainable transceiver 20 receives images and/or image data from one or more cameras in communication with the rear view mirror 16 (e.g., through the control circuit 60 and/or camera interface 70 of the rear view mirror 16). The trainable transceiver 20 may request, receive, and/or otherwise access images and/or image data from cameras in communication with the rear view mirror 16 using the rear view mirror interface 88. Alternatively, the control circuit 24 of the trainable transceiver 20 may request, receive, and/or otherwise access images and/or image data from cameras in communication with the rear view mirror 16 directly without the rear view mirror interface 88 in some embodiments. The trainable transceiver 20 may use images and/or image data received from the rear view mirror 16 to facilitate and/or perform the functions described herein.

Advantageously, retrieving images from the front facing camera 66 in the rear view mirror housing may provide better image quality than images from other front facing cameras 18 (e.g., bumper mounted cameras). The front facing camera 66 mounted in the rear view mirror housing is protected by the glass of the windshield from damage (e.g., due to abrasion from particles from the road or other sources). Additionally, the front facing camera 66 mounted in the rear view mirror 16 is likely to have a less obstructed view than other cameras as the windshield wipers clear water, debris, and/or other obstructions which may obscure the camera's field of view. This may provide the trainable transceiver 20 with more accurate images and/or higher quality images for use in the functions described herein.

In one embodiment, the trainable transceiver 20 is configured to provide output to a vehicle occupant using the display 72 and/or speaker 76 of the rear view mirror 16. The trainable transceiver 20 may control the output of the rear view mirror 16 by sending control signals, instructions, information, and/or data to the rear view mirror 16 or otherwise control the display 72 and/or speaker 76 of the rear view mirror 16. In one embodiment, the trainable transceiver 20 controls the output of the rear view mirror 16 using the rear view mirror interface 88. For example, the rear view mirror interface 88 may format instructions, control signals, and/or information such that it can be received and/or processed by the control circuit 60 of the rear view mirror 16. In other embodiments, the control circuit 24 of the trainable transceiver 20 may communicate directly with the control circuit 60 of the rear view mirror 16. The control circuit 60 of the rear view mirror 16 may handle, process, output, forward and/or otherwise manipulate instructions, control signals, data, and/or other information from the trainable transceiver 20. In other embodiments, the control circuit 60 of the rear view mirror 16 forwards, routes, or otherwise directs the instructions, control signals, outputs, data, and/or other information to other components of the rear view mirror 16 without additional processing or manipulation. For example, the trainable transceiver 20 may output a frame buffer to the control circuit 60 of the rear view mirror 16 which then routes the frame buffer to the display 72 without further manipulation. This may include storing the frame buffer in memory 64 included in the control circuit 60 of the rear view mirror 16 and sending an address corresponding to the frame buffer to the display 64. As described in greater detail with respect to later figures, the display may be used by the trainable transceiver 20 to communicate information to a vehicle occupant regarding a home electronics device, remote device, mobile communication device, or other device controlled by and/or in communication with the trainable transceiver 20.

Advantageously, displaying information related to the trainable transceiver 20 using the display 72 of the rear view mirror 16 may make a user more likely to view the information. Vehicle occupants, particularly the driver, are accustomed to looking at the rear view mirror 16 frequently. A vehicle driver may be particularly likely to look at the rear view mirror 16 while reversing out of a garage and/or down a driveway. As such, a vehicle driver is more likely to see information from the trainable transceiver 20 related to a home electronics device (e.g., a garage door opener) if the information is displayed on the rear view mirror 16 rather than in another location.

The same or similar techniques as described above may be used to control the speaker 76 of the rear view mirror 16 for use with the trainable transceiver 12. As described in greater detail with respect to later figures, the speaker 76 may be used by the trainable transceiver 20 to communicate information to a vehicle occupant regarding a home electronics device, remote device, mobile communication device, or other device controlled by and/or in communication with the trainable transceiver 20.

The trainable transceiver 20 may be configured to receive inputs from the sensors 80 of the rear view mirror 16 and/or control sensors of the rear view mirror 16. The trainable transceiver 20 may access sensor data and/or control sensor data through the rear view mirror interface 88 and/or the control circuit 60 of the rear view mirror 16. In other embodiments, sensor data may be accessed and/or sensors controlled by the control circuit 24 of the trainable transceiver 20 and/or the control circuit 60 of the rear view mirror 16. The trainable transceiver 20 may receive sensor data and process, transmit, format, send data to other devices, and/or otherwise manipulate the sensor data. The trainable transceiver 20 may also control sensors. For example, the trainable transceiver 20 may turn sensors on or off, calibrate sensors, and/or otherwise manipulate sensors. In some embodiments, the trainable transceiver 20 receives commands, instructions, data, and/or other information through one or more sensors. For example, the trainable transceiver 20 may receive voice commands from a user through the microphone 84. Continuing the example, data may be optically received using the light sensor 82. In some embodiments, the trainable transceiver 20 receives information (e.g., information input through physical interaction with the rear view mirror) through the accelerometer of the rear view mirror.

In some embodiments, the trainable transceiver 20 receives inputs from the operator input device 74 of the rear view mirror 16 (e.g., via the control circuit 60 of the rear view mirror 16 and/or the rear view mirror interface 88). The trainable transceiver 20 may send a control signal, instructions, information or otherwise communicate with the control circuit 60 of the rear view mirror 16 to cause inputs to be communicated to the trainable transceiver 20. The trainable transceiver 20 may use the operator input device 74 of the rear view mirror 16 to augment or replace the operator input device 22 associated with the trainable transceiver 20.

In some embodiments, the trainable transceiver 20 draws electrical power through a connection with the power supply 86 included in the rear view mirror 16. As explained above, the power supply 86 may provide power to the rear view mirror 16 from the electrical system of the vehicle and/or a battery. The trainable transceiver 20 may draw power from the power supply 86 as well. For example, the trainable transceiver 20 may be connected to the power supply 86 through the rear view mirror interface 88. Alternatively, components of the trainable transceiver 20 may draw power from direct connections to the power supply 86. In other embodiments, the trainable transceiver 20 draws power from the control circuit 60 of the rear view mirror 16 which in turn draws power from the power supply 86.

In one embodiment, the trainable transceiver 20 may use the transceiver included in the rear view mirror and/or coupled to the rear view mirror (e.g., a transceiver mounted in the vehicle) to send and/or receive activation signals, control signals, images, image data, and/or other information. For example, the trainable transceiver 20 may configure the transceiver and/or control circuit 60 of the rear view mirror 16 such that images and/or image data from a remote camera may be received (e.g., a camera included in or coupled to a home electronic device). In other embodiments, the trainable transceiver 20 may use the transceiver to access the internet and/or other device (e.g., home electronic devices, remote devices, mobile communications devices, networking devices, etc.). This may allow the trainable transceiver 20 to receive images and/or image data from remote cameras. For example, the trainable transceiver 20 may access, through the transceiver and/or internet) an IP camera located remote from the vehicle 10 and retrieve images and/or image data.

The trainable transceiver 20 may be physically attached to or otherwise included in the rear view mirror 16. In one embodiment, the trainable transceiver 20 may be added to or otherwise installed by wiring the rear view mirror interface and/or other components to one or more components of the rear view mirror 16 (e.g., the power supply 86, and/or the control circuit 60). As part of a retrofit instillation, the trainable transceiver 20 may be physically coupled to the rear view mirror 16. For example, a housing containing one or more components of the trainable transceiver 20 may be coupled to a housing of the rear view mirror 16. In other embodiments, the trainable transceiver 20 (e.g., one or more components of the trainable transceiver 20) may be a module or package included within the housing of the rear view mirror 16. For example, the trainable transceiver 20 may be attached to rear view mirror hardware (e.g., the rear view mirror interface 88 wired to the power supply 86 and/or the control circuit 60 of the rear view mirror 16), and the trainable transceiver 20 and rear view mirror hardware placed within a single housing.

Figure 2E:
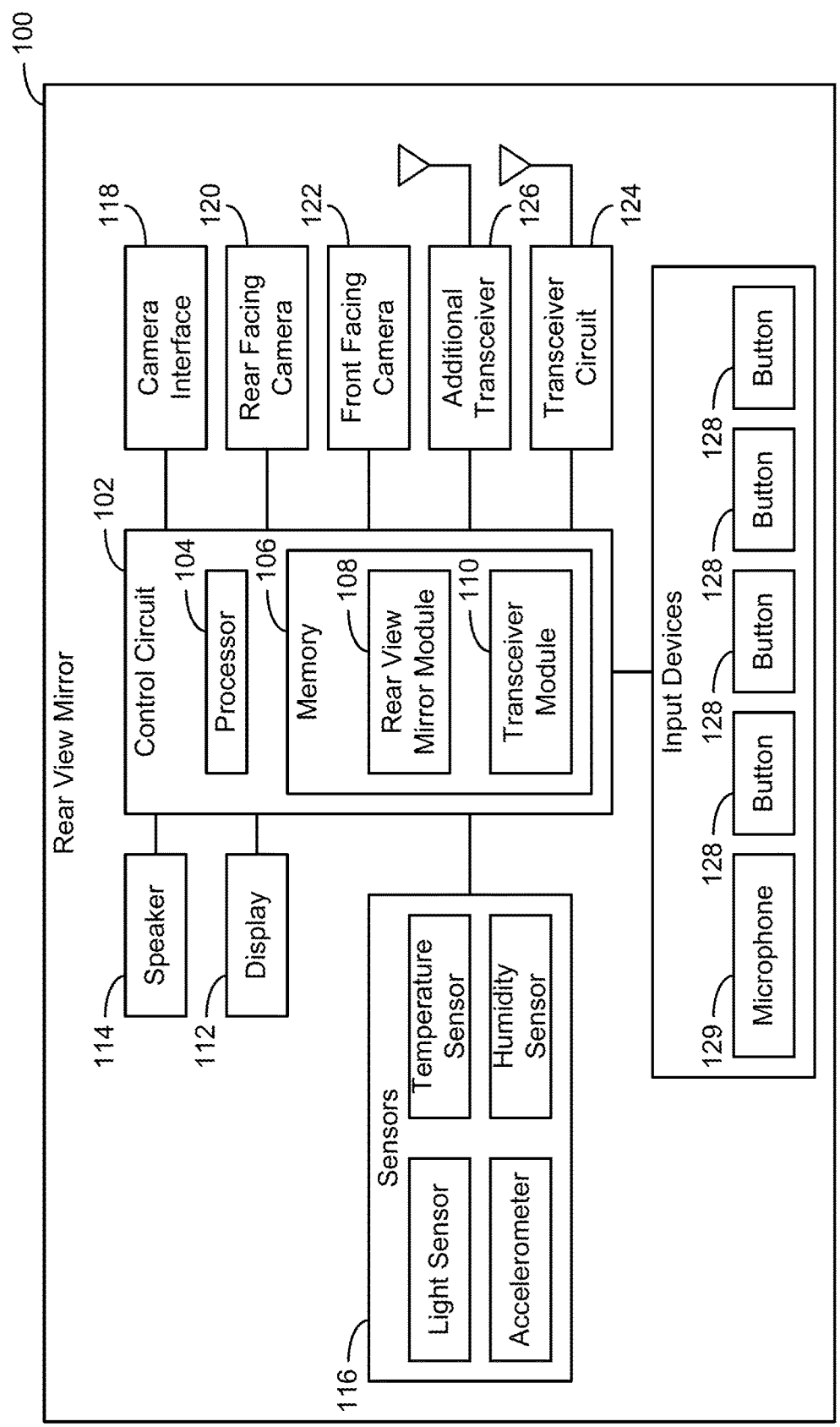
FIG. 2E illustrates a trainable transceiver sharing one or more components with a rear view mirror of a vehicle according to an exemplary embodiment.

Referring now to FIG. 2E, an exemplary embodiment of an integrated trainable transceiver and rear view mirror is illustrated as an integrated system 100. The unique components of the trainable transceiver 20 may be integrated with the components of a rear view mirror in the integrated system 100. Advantageously, this allows the rear view mirror 100 to have the functionality of the trainable transceiver 20 described herein and for the trainable transceiver to use components of the rear view mirror system as described herein thereby avoiding duplicative components and reducing cost. In one embodiment, the components associated with the trainable transceiver 20 and the components associated with the rear view mirror 16 are located within a rear view mirror housing or housings. The components may be packaged together as a single rear view mirror. In other embodiments, components of the integrated system may be located remote from one another, in different housings, or otherwise be part of a distributed system.

In some embodiments, the functions of both the trainable transceiver and the rear view mirror may be facilitated and/or performed using a single control circuit 102. The single control circuit 102 may include a processor 104 and memory 106 which is shared by the functions of the trainable transceiver and the functions of the rear view mirror. In some embodiments, the memory 106 of the single control circuit 102 includes a rear view mirror module 108 containing database components, object code components, script components, or any other type of information structure for supporting various activities and information structures related to the functions of the rear view mirror. The memory may include a transceiver module 110 containing database components, object code components, script components, or any other type of information structure for supporting various activities and information structures related to the functions of the trainable transceiver. Thus, a single control circuit 102 may support and/or carry out the functions described herein in reference to the trainable transceiver and the functions of the rear view mirror. In some embodiment, the control circuit 102 allocates resources (e.g., processing, memory, control of other hardware components, and/or other hardware and software resources) between functions associated with the trainable transceiver and functions associated with the rear view mirror.

The integrated trainable transceiver and rear view mirror may include some or all of the components described above with reference to FIG. 2D. For example, the integrated system 100 may include a display 112, speaker 114, sensors 116, camera interface 118, rear facing camera 120, and/or front facing camera 122. These components may have the same functions with respect to the trainable transceiver and the rear view mirror as described above.

In one embodiment, the integrated system 100 includes a transceiver circuit 124. The transceiver circuit 124 may be used, as previously described, to send activation signals and/or communicate with home electronic devices, remote device, mobile communications device, network device, or other hardware. The integrated system 100 may also include one or more additional transceivers 126 as previously described. Additional transceivers 126 may allow for and/or facilitate communication between the integrated system 100 and other devices. In one embodiment, the additional transceiver 126 is or includes a cellular transceiver and/or other hardware providing the integrated system with access to the internet. Advantageously, including a transceiver circuit 124 and/or additional transceiver 126 in one or more rear view mirror housings may locate the transceiver in a good location for improving reception and/or transmission of wireless signals. The integrated system 100 including the rear view mirror and therefore the transceiver may be positioned high on the vehicle and be at least partially surrounded by glass. This may improve transmission and/or reception range, quality, and/or other characteristics.

In one embodiment, the input devices of the integrated system are shared between functions related to the rear view mirror and functions related to the trainable transceiver. For example, a single button 128 may provide input related to either the trainable transceiver or the rear view mirror depending on which function controls the resource. For example, a single button 128 may cause the control circuit 102 to dim the mirror when the control circuit 102 treats the button 128 as a resource related to the rear view mirror functions, and the same button 128 may cause the control circuit 102 to send an activation signal using the transceiver circuit 124 when the control circuit 102 treats the button 128 as a resource related to the trainable transceiver functions. Advantageously, this may allow the integrated system 100 to share buttons 128 or other input devices for different functions and thereby simplify the system and/or reduce cost.

The same sharing of hardware components may apply to input devices such as a microphone 129 and/or output devices such as the display 112 and/or speaker 114. The control circuit 102 may arbitrate inputs based on a variety of factors. For example, the control circuit 102 may take into account, inputs selecting which function the user wishes to control (e.g., a button to switch between functions, what function the previous input, output, or other action was related to, geographic proximity to a device controlled by the functions of the trainable transceiver, and other factors).

Using the above described hardware, software, and/or other components, a trainable transceiver may perform a variety of functions. These functions may enhance the usability, convenience, and/or otherwise improve a trainable transceiver system from the user's perspective. The trainable transceiver may be any of the embodiments discussed above (e.g., stand alone, coupled to a rear view mirror, integrated with a rear view mirror, etc.) and/or be a combination of any of the components described above.

Figure 3:
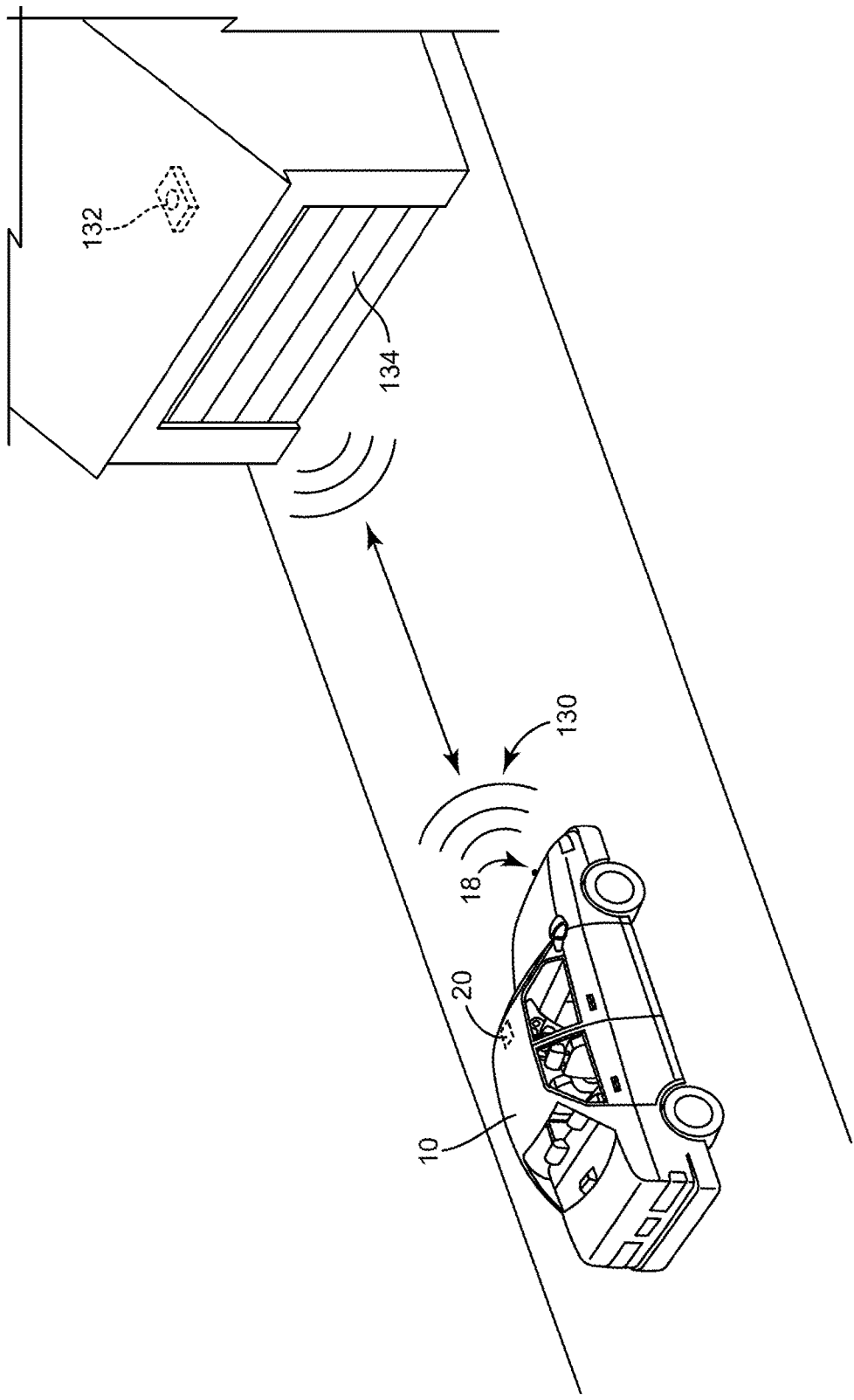
FIG. 3 illustrates a trainable transceiver communicating with a home electronics device based in part on an image and/or image data received from a camera.

Referring now to FIG. 3, an embodiment of the trainable transceiver 20 is illustrated sending an activation signal 130 to a garage door opener 132 (e.g., home electronics device). In one embodiment, the trainable transceiver 20 automatically sends an activation signal to the garage door opener 132 when the corresponding garage door 134 has been detected. The garage door 134 may be detected, differentiated, and/or otherwise recognized by the trainable transceiver 20 using one or more images and/or image data from a camera (e.g., the forward facing camera 18). Images and/or image data may be received by the control circuit and analyzed using image processing techniques, image processing algorithms, object/image recognition techniques or algorithms, object detection algorithms, and/or other image analysis techniques. The image(s) and/or image data provided by one or more cameras may be compared to one or more comparison images of the garage door 134.

The comparison images may be images of the garage door 134 corresponding to a garage door opener 132 for which activation signal information (e.g., frequency, encryption information, etc.) is known. These comparison images may be stored in memory local to the trainable transceiver 20 and/or vehicle 10, stored in a remote database (e.g., a server) and accessed by the trainable transceiver 20 through wireless communication, and/or otherwise made accessible to the control circuit of the trainable transceiver 20. Activation signal information may be stored along with the corresponding comparison image such that the activation signal information may be retrieved for a corresponding comparison image when a sensed image is found to match the comparison image.

If the image from the camera is determined to match (e.g., within a tolerance) the comparison image, the trainable transceiver 20 sends an activation signal 130 formatted based on the activation signal information corresponding to the comparison image. The activation signal 130 may be formatted using activation signal information retrieved from the storage location in which the comparison image is stored. For example, if a sensed image is determined to match a comparison image stored in local memory, the control circuit may read the local memory to retrieve the activation signal information corresponding to the comparison image. Using the parameters contained within the activation signal information, the control circuit may format a control signal to be sent by the transceiver circuit such that the activation signal 130 will control or otherwise communicate with the garage door opener 132 corresponding to the comparison image (and sensed image from the camera). The sensed image from the camera may be from any camera mounted in or on the vehicle. Images from multiple cameras may be analyzed. In one embodiment, the control circuit analyzes only images from the front or rear facing cameras of the vehicle. In further embodiments, the control circuit only analyzes images from the front facing camera 18. Alternatively, the control circuit may be configured to analyze images only from the rear facing camera.

In some embodiments, the control circuit analyses images form one or more cameras continuously. In other embodiments, the control circuit activates one or more cameras at intervals in order to capture images for processing. For example, images may be analyzed every thirty seconds. Other intervals are possible.

In some embodiments, the trainable transceiver stops analyzing images upon sending an activation signal. The trainable transceiver may stop analyzing images when it has detected that it is outside of a geographic boundary associated with a device the trainable transceiver is trained to control. In further embodiments, the trainable transceiver may stop analyzing images after a period of time and/or a set number of failed comparisons.

In some embodiments, the comparison image(s) of the garage door controlled by the garage door opener are stored (e.g., in memory of the trainable transceiver) when the trainable transceiver is trained to the garage door opener. For example, during the training process, a user may be instructed to position the vehicle, in which the trainable transceiver is located, in front of the garage door for which the trainable transceiver is being trained to operate. The trainable transceiver may then store one or more images from the camera(s) to be used as comparison images during operation of the trainable transceiver as described above. In some embodiments, a trainable transceiver which has already been trained to a garage door opener may be further trained to operate automatically using the image based techniques described herein. For example, a user may be prompted to position the vehicle in front of the garage door which the trainable transceiver is trained to operate. Upon pushing a button, speaking a command, or otherwise providing a user input an image may be captured and stored in memory for use as a comparison image. In other embodiments, the image may be captured and stored automatically.

In further embodiments, a user may provide an image from a source other than the vehicle. For example, a user may capture an image of the garage door using a camera such as a digital camera, smartphone camera, or other image capturing device. The image may be provided to the trainable transceiver by a user uploading the image through an internet connection, transferring the image to the trainable transceiver (e.g., transferring the image from a smartphone to the trainable transceiver using a Bluetooth transceiver), uploading the image to a server or other database (e.g., using a web browser interface) which the trainable transceiver may access, and/or otherwise providing the image for use by the trainable transceiver.

The same or similar techniques may be used to store a geographic location of the garage door opener. This location may be used as described above to create a geographic boundary in which the trainable transceiver analyzes images to determine if they match the comparison image.

In further embodiments, activation signals, control signals, and/or other information may be communicated with additional home electronic devices, remote devices, mobile communications device, network devices, and/or other devices when the trainable transceiver detects a garage door using one or more cameras. The same techniques described above may be used to automatically or otherwise control these devices. For example, upon detecting a garage door which matches the comparison image, the trainable transceiver may send an activation signal to a security system (e.g., disarming the security system), home lighting device (e.g., turning on the lights in a home), security gate (e.g., closing the gate behind the vehicle), appliance (e.g., turning on a television), remote device (e.g., turning on a laptop computer), etc. Any device configured to be controlled by and/or communicate with the trainable transceiver may have functions which are triggered automatically when the trainable transceiver determines that a sensed image matches a comparison image. In some embodiments, multiple activation signals or other communication signals may be sent to a plurality of devices upon detection of a single image. For example, the trainable transceiver may store a single comparison image for use with multiple devices such that when a sensed image is determined to match the comparison image, multiple activation signals are sent. Each activation signal may correspond to one of the devices using the same comparison image.

In some embodiments, the comparison image may be an image other than of a garage door. Advantageously, this allows a user to have automatic control over one or more devices even if the user does not have a garage. For example, the comparison image may be an image of a street sign, home, gate, building, mailbox, parking structure, or other object. An image of any object may be used. In some embodiments, the trainable transceiver may ensure that the object is positioned such that when detected, the device to be controlled by the trainable transceiver (e.g., home electronic device) is within range of the transceiver circuit. For example, the trainable transceiver may send test signal during training.

Figure 4A:
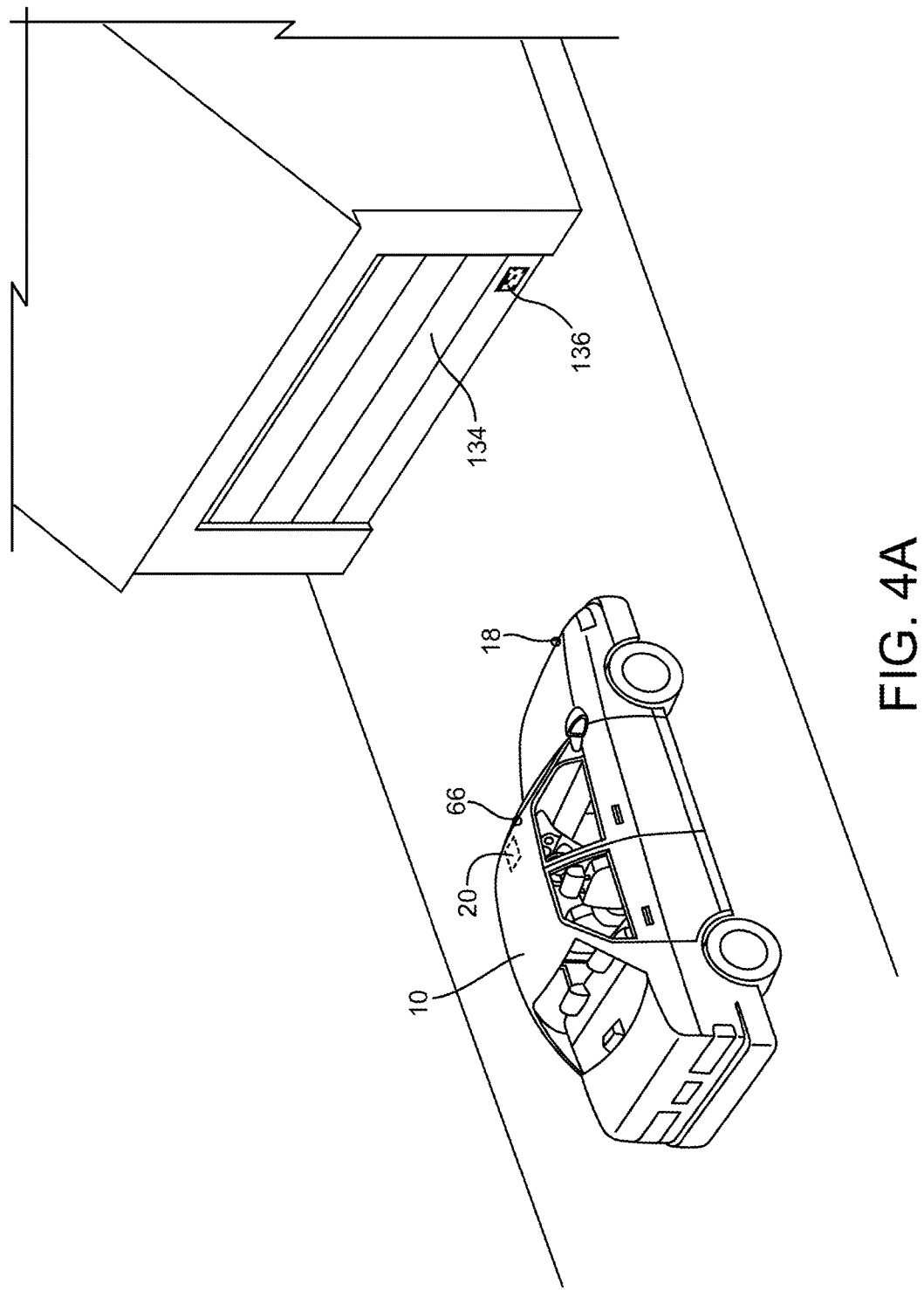
FIG. 4A illustrates a machine readable image that may be read by a trainable transceiver coupled to a camera according to an exemplary embodiment.
Figure 4B:
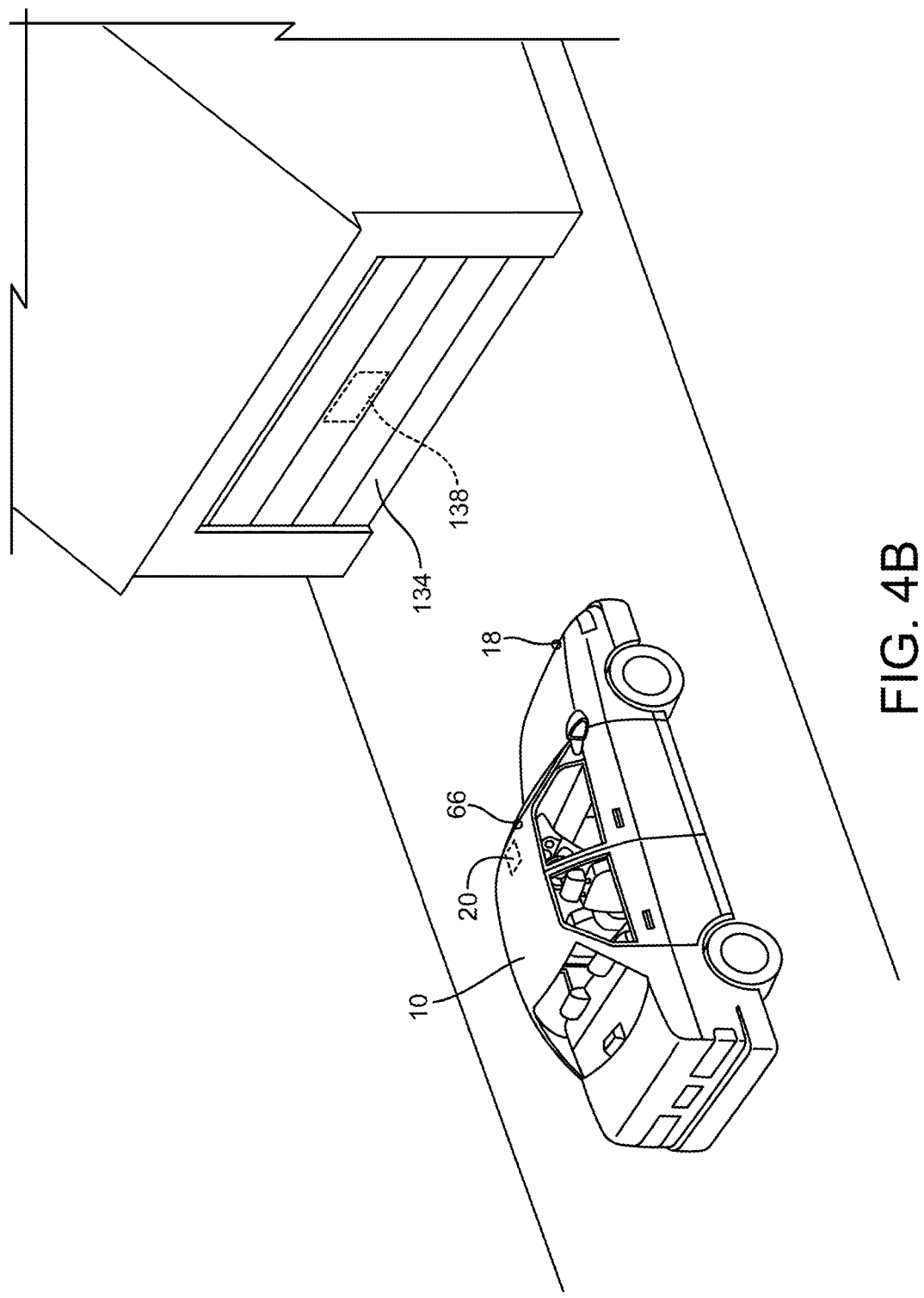
FIG. 4B illustrates an invisible image that may be read by a trainable transceiver coupled to a camera according to an exemplary embodiment.

Referring now to FIGS. 4A-4B, the trainable transceiver may detect a garage door 134 corresponding to a garage door opener based on an image 136 on the garage door 134 in some embodiments. Advantageously, detecting a particular image 136 on a garage door 134 may require less computing resources, be more accurate, provide a greater amount of information, or otherwise be preferable to detecting a garage door 134 based on an image of the garage door 134 itself.

In one embodiment, the garage door 134 includes a machine readable image 136 as illustrated in FIG. 4A. The machine readable image 136 may be read by the trainable transceiver and one or more cameras in communication in the trainable transceiver 20 (e.g., a front facing camera 66 mounted in the rear view mirror 16).

Referring now to FIG. 4B, the machine readable image and/or other image is invisible to the human eye in some embodiments. The image, object, and/or machine readable image 138 used by the trainable transceiver 20 as described above may be visible to a camera (e.g., camera 18 or camera 66) but be invisible to the human. Advantageously, the invisible image 138 may be more aesthetically pleasing than a visible image. The invisible image 138 may also provide an advantage by keeping the encoded information more secure than if it was visible to any person passing by the image.

Figure 4C:
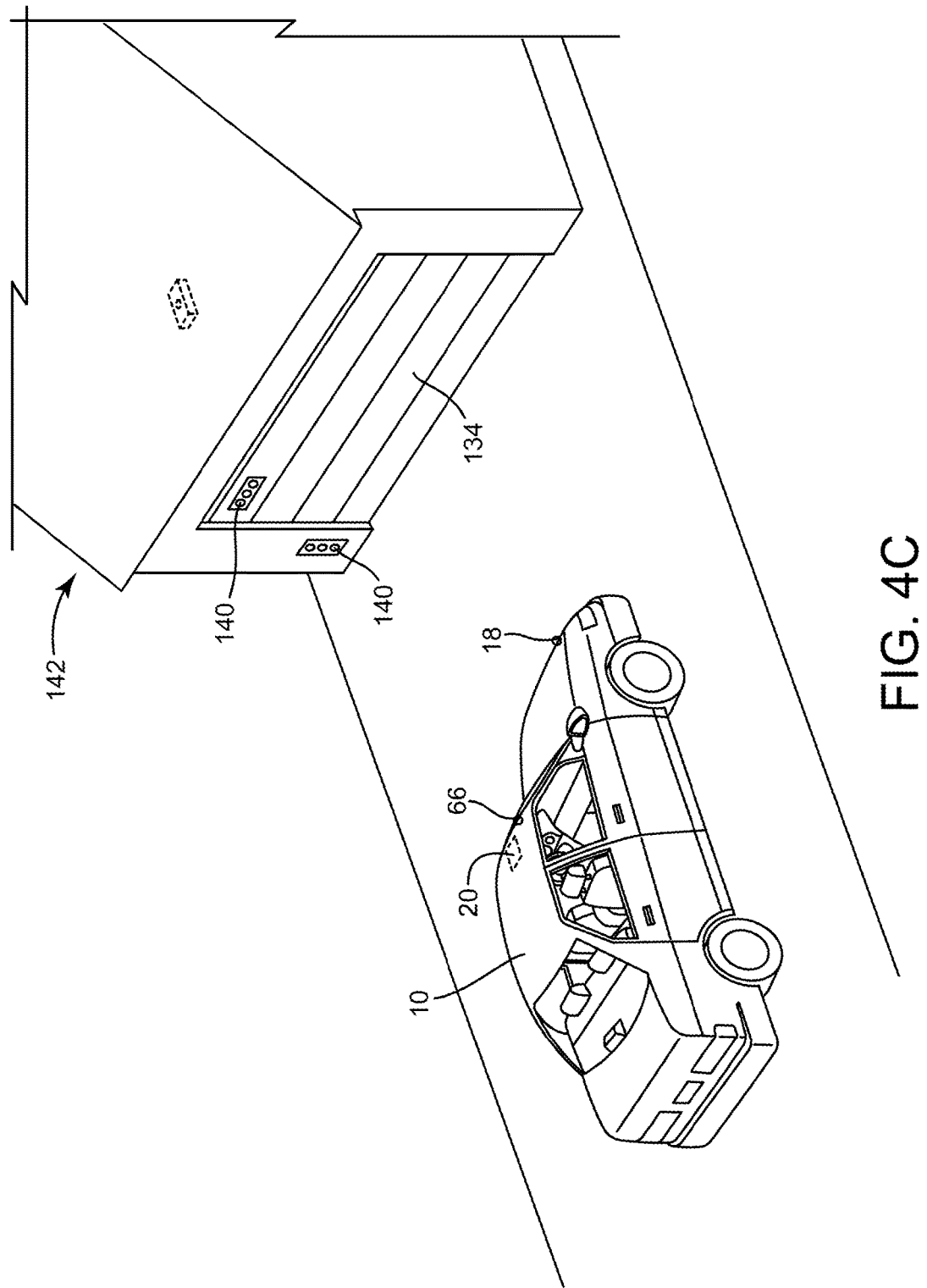
FIG. 4C illustrates an exemplary embodiment of a home electronics device coupled to infrared light emitting diodes which transmit information which may be received by a trainable transceiver coupled to a camera.

Referring generally to FIGS. 4A-4C, the image used to identify the home electronics device, remote device, network device, or other device may be generated by a user of the trainable transceiver 20 in some embodiments. This may allow a user to retrofit an existing garage door opener or other device such that it may be automatically controlled by the trainable transceiver 20 using camera detection of the image. For example, a user may provide a comparison image taken with a camera, apply an invisible ink to the garage door or other object, attach a sticker to the garage door or other object which includes a machine readable image (either a visible image 136 or invisible image 138), or otherwise provide a way to identify a device controlled by the trainable transceiver 20. In other embodiments, ink, a sticker, or image may be provided with a garage door opener or other device which identifies the device. In further embodiments, the garage door or other object may include a preprinted visible or invisible image which identifies a device associated with the object.

Referring not to FIG. 4C, a home electronic device, remote device, or other device configured to be controlled by the trainable transceiver may include one more light sources 140 which produce light in a spectrum other than visible light. For example, the light source 140 may produce infrared light, ultraviolet light, or otherwise produce non-visible electromagnetic radiation. The light source 140 may be mounted on a garage door 134, garage 142, or other location with a line of sight to a camera associated with a vehicle 10. In some embodiments, the light from the light source 140 is used to identify the corresponding device to the trainable transceiver 20 (e.g., by transmitting, using light, identification information to a camera or other sensor). The light source 140 may be coupled to the device it identifies. The device may control and or power the light source 140. In some embodiments, the light source 140 is battery powered or otherwise not electrically coupled to the device it identifies.

As described with reference to FIG. 3 above, a single machine readable image 136, invisible image 138, light source 140 and/or other source of identification may identify a plurality of devices. The trainable transceiver 20 may send a plurality of activation signals upon reading a single machine readable image 136, detecting a single invisible image 138, and/or receiving information from a light source 140.

Referring now to FIG. 5A, the trainable transceiver may use a combination of cameras and positioning information to control multiple garage doors corresponding to a plurality of locations. For example, the trainable transceiver may be trained to operate two garage door openers at one location and two garage door openers at a second location. Using a positioning data (e.g., based on a GPS signal, dead reckoning, cellular triangulation, and/or other locating techniques), the trainable transceiver may determine if it is within a geographic boundary 150. In one embodiment, the geographic boundary 150 is based on the location of the device for which the trainable transceiver is trained to control. Each device may have its own geographic boundary 150. In other embodiments, the geographic boundary 150 is determined by the location(s) at which the trainable transceiver is trained. The geographic boundaries of multiple devices may be consolidated into a single geographic boundary 150 for a location (e.g., a first geographic boundary 150a for a first home 152a and a second geographic boundary 150b for a second home 152b). In some embodiments, the position of the device or position for the geographic boundary 150 is determined using GPS data received when the trainable transceiver is trained to operate a device.

Referring now to FIG. 5B, the trainable transceiver may use the techniques described above to control multiple garage doors corresponding to a plurality of locations. For example, the trainable transceiver may be trained to operate two garage door openers 162 and 164 at a first location 160 and two garage door openers 166 and 168 at a second location 165. Each device may have a separate image and/or identification information in a machine readable or other image. Therefore, the trainable transceiver will operate the correct garage door opener via activation signal when the sensed image or identification information matches the unique stored comparison image or identification information corresponding to the garage door opener.

The techniques described above with reference to FIGS. 5A and 5B may be used to control devices other than garage door openers. The above described techniques may be used to control multiple devices at multiple locations with devices being any of home electronic devices, remote devices, mobile communications devices, network devices, and/or other devices.

Figure 5C:
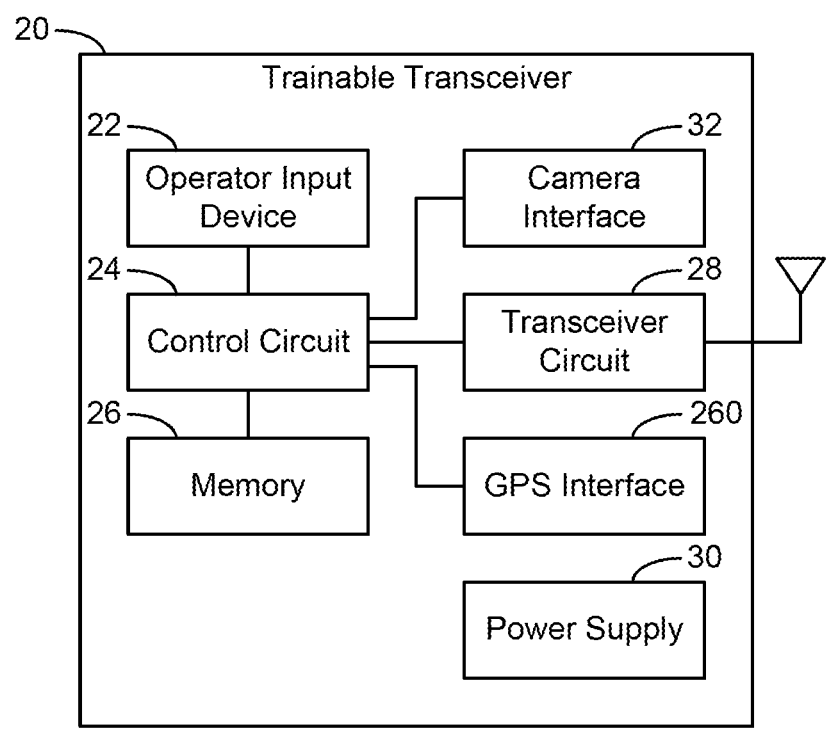
FIG. 5C illustrates a trainable transceiver having a global positioning system interface according to an exemplary embodiment.

Referring now to FIG. 5C, the trainable transceiver 20 may include, in some embodiments, a GPS interface 260 for receiving information and/or data regarding the position or location of the trainable transceiver 20. In some embodiments, GPS information may be used in place of or in conjunction with the above described techniques to determine the position of the vehicle in the garage. For example, a user may position the vehicle such that it is well positioned in the garage. The user may then set the position of the vehicle (e.g., through an input on an operator input device 22). The trainable transceiver 20 may store the current position of the trainable transceiver 20 (and therefore the vehicle) based on GPS information received through the GPS interface 260. GPS information received as the vehicle is pulled into the garage may be compared against the GPS information stored when the vehicle was well positioned in the garage. The trainable transceiver 20 may determine if the vehicle is well positioned based entirely or in part on the difference between the sensed GPS position and the stored GPS position.

Referring now to FIG. 6A, a trainable transceiver 20 having three input buttons 170 is illustrated according to an exemplary embodiment. In some embodiments, the trainable transceiver 20 automatically sends an activation signal as described above with reference to FIG. 3. The buttons 170 of the trainable transceiver 20 may be configured to activate the devices the trainable transceiver 20 is trained to control. The buttons 170 may allow a user to manually activate the device rather than relying on the trainable transceiver 20 to automatically send the activation signal. The buttons 170 may be a redundant set of controls. In other embodiments, the trainable transceiver 20 does not automatically send an activation signal. For example, one button 170 may be configured to operate multiple devices with each device at a different location (e.g., the left button 170 may operate a garage door opener at a home and a different garage door opener at a vacation home). Upon a user pressing the button 170, the trainable transceiver 20 may determine which activation signal to send using one of the previously described techniques. For example, the trainable transceiver 20 may determine to send the control signal for operating the garage door opener at the vacation home based on image of the associated garage door from a camera matching a comparison image stored in memory which corresponds to the garage door opener for the vacation home. Multiple buttons 170 may have multiple location dependent functions with the proper activation signal being determined using one of the above described techniques.

Referring now to FIG. 6B, a trainable transceiver 20 having a single multiple channel button 172 is illustrated according to an exemplary embodiment. In some embodiments, the trainable transceiver 20 does not automatically identify and/or send activation signals as described above with reference to FIG. 3. The trainable transceiver 20 may attempt to identify a home electronic device, remote device, and/or other devices upon receiving a user input (e.g., a button press). Upon receiving the input, the trainable transceiver 20 may activate one or more cameras, receive images form one or more cameras, request images from one or more cameras, and/or otherwise access current images and/or image data from one or more cameras. The trainable transceiver 20 may then use one or more of the techniques described above to identify a device which the trainable transceiver has been trained to control. For example, the trainable transceiver 20 may compare a sensed image of a garage door to a stored comparison image of the garage door corresponding to the garage door opener the trainable transceiver 20 has been trained to control. Upon identifying a device the trainable transceiver 20 is trained to control, the trainable transceiver 20 may format and/or send an activation signal to the device.

Advantageously, the single multiple channel button 172 may allow a user to control a plurality of devices with a single input button or other device. The trainable transceiver 20 used the identification techniques previously described to discriminate between devices it is trained to control in order to control the device the used wants to control based on the images and/or image data from one or cameras. Thus, a user may control multiple devices with a single input and control the desired device based on the location of the vehicle (e.g., what images and/or objects the camera(s) associated with the vehicle detect). In some embodiments, the trainable transceiver 20 may discriminate between devices without using GPS positioning information. For example, the trainable transceiver 20 may discriminate between devices using only camera based techniques. This may provide an advantage as the trainable transceiver 20 would not require additional hardware such as a GPS transceiver and would therefore be simpler.

Figure 7:
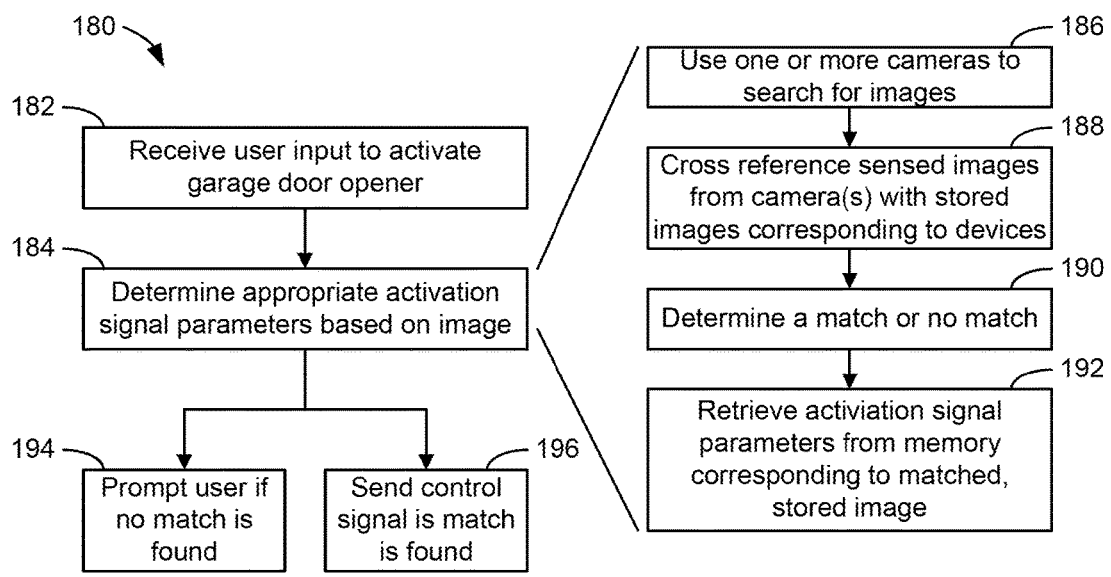
FIG. 7 illustrates a flow chart showing one embodiment of a method of sending an activation signal with a trainable transceiver based on an image received from a camera.

Referring now to FIG. 7, a flow chart illustrating an exemplary method 180 of controlling a device using the trainable transceiver is illustrated. The trainable transceiver may receive a user input to activate a garage door opener (step 182). Upon receiving the user input, or automatically in some embodiments, the trainable transceiver may determine the appropriate activation signal parameters based on an image and/or image data (step 184). In one embodiment, the trainable transceiver determines the appropriate activation signal parameters by using one or more cameras to sense objects and/or images (step 186). The cameras may be controlled and/or images and/or image data received from the cameras using a camera interface and/or the control circuit. The images and/or image data from the camera(s) may then be cross referenced against stored images (e.g., comparison images) which correspond to devices the trainable transceiver has been trained to control (step 188). The trainable transceiver may determine (e.g., using the control circuit) if a match has been found or if no match has been found (step 190). If a sensed image and a stored image are determined to match, the trainable transceiver may retrieve (e.g., using the control circuit) activation signal parameters and/or other communication information from memory which correspond to the stored image found to match the sensed image (step 192). If no match is found between the sensed image and a stored image, the trainable transceiver may provide a prompt to the user (step 194). If a match is found between the sensed image and the stored image and the trainable transceiver retrieves activation signal parameters, the trainable transceiver may send an activation signal (step 196).

The trainable transceiver and one or more cameras may be used to prevent a vehicle from coming into contact with an object such as a garage door. In one embodiment, a rear facing camera of a vehicle is coupled to or otherwise in communication with a trainable transceiver. For example, the rear facing camera may transmit images to, be controlled by, and/or otherwise communicate with the trainable transceiver through a camera interface. The trainable transceiver may use one or more image processing techniques to determine if the vehicle is likely to come into contact with an object. For example, the trainable transceiver may determine that a garage door is closed while the vehicle is backing towards the garage door. The trainable transceiver may be configured to produce a warning if the garage door is detected. For example, the trainable transceiver may produce an audible warning such as a noise or voice message (e.g., "the garage door is down"). The trainable transceiver may also produce a visual warning such as image or test displayed on a display in communication with the trainable transceiver (e.g., a display controlled by the trainable transceiver through the vehicle electronics system and/or a camera interface). The same techniques may be used to warn a driver or other occupant a vehicle using other camera(s) (e.g., front facing cameras) and/or ether situations in which the vehicle may come into contact with an object (e.g., pulling forward into a garage door, coming into contact with a closed gate, etc.).

In some embodiments, the trainable transceiver is configured to send an activation signal to a home electronics device, remote device, mobile communications device, network device, and/or other devices in order to prevent a vehicle from coming into contact with an object. The trainable transceiver may transmit the activation signal in addition to providing a warning or instead of providing a warning. The trainable transceiver may be configured to determine if a collision is likely using one or more cameras. For example, the trainable transceiver may analyze (e.g., using the control circuit) images and/or image data from one or more cameras to determine if the vehicle is approaching an object. The trainable transceiver identify a home electronic device remote device, mobile communications device, network device, and/or other devices that the vehicle may come into contact using one or more of the techniques described above (e.g., comparing a sensed image to a comparison image). If the trainable transceiver detects that the vehicle is likely to come into contact with the detected object, the trainable transceiver may transmit (e.g., using the control circuit and/or transceiver circuit) an activation signal formatted to activate the device associated with the object with which the vehicle may come into contact.

The trainable transceiver may receive images and/or image data from a rear facing camera. The trainable transceiver may determine that there is an object behind the vehicle that the vehicle may come into contact with. The trainable transceiver may also determine that the object is associated with a home electronics device (e.g., garage door opener) that the trainable transceiver is trained to control. For example, the trainable transceiver may identify the object as a garage door using one of the techniques described above with reference to FIGS. 3-5B. The trainable transceiver may then retrieve from memory activation signal parameters for controlling the garage door opener associated with the detected garage door. Using the activation signal parameters, the trainable transceiver may send an activation signal to the garage door opener associated with the garage door. Advantageously, the trainable transceiver operating in this manner may automatically raise the garage door and prevent the vehicle from coming into contact with the garage door. The same techniques may be used with other and/or additional hardware to prevent a vehicle collision. For example, a front facing camera may be used to detect objects and/or identify objects as controllable by the trainable transceiver. In one embodiment, the trainable transceiver may automatically control a gate using the techniques described herein to prevent a vehicle from coming into contact with the gate (e.g., automatically opening the gate).

In some embodiments, the trainable transceiver and/or one or more cameras operate continuously to detect possible collisions. Alternatively, the trainable transceiver may analyze images and/or image data at set time intervals in order to detect the potential for the vehicle to come into contact with an object. In other embodiments, the trainable transceiver analyzes images and/or image data only upon the occurrence one or more triggering events. For example, the trainable transceiver may only analyze images and/or image data when the trainable transceiver detects that the vehicle has been put into a reverse gear (e.g., using a connection to a vehicle electronics system). In some embodiments, the trainable transceiver analyzes images and/or image data to determine if a collision is likely when the trainable transceiver is detected to be within a geographic boundary determined by the location of one or more devices the trainable transceiver is trained to control. In further embodiments, the trainable transceiver may use a combination of triggering events, inputs, data, and/or other factors to determine when to analyze images and/or image data for possible collisions.

The trainable transceiver and/or one or more cameras may be used in conjunction with a remote start system of a vehicle. The trainable transceiver may be used to provide safe operation of the remote start system.

Figure 8:
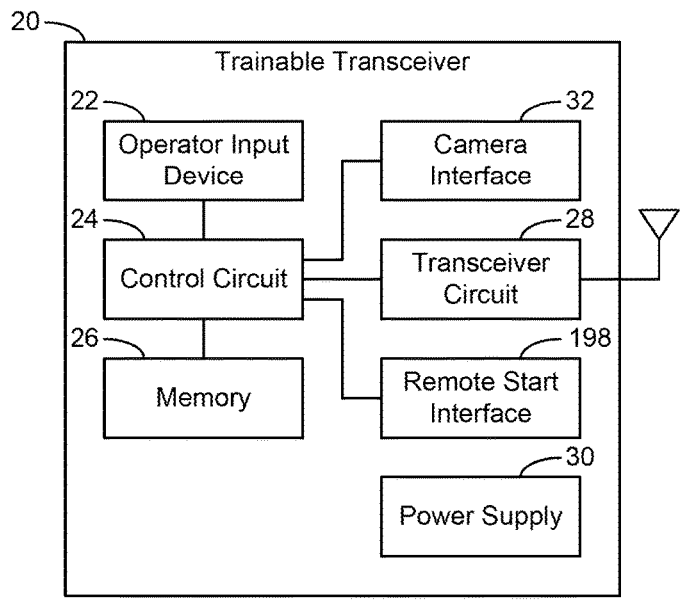
FIG. 8 illustrates an embodiment of a trainable transceiver having a remote start interface.

Referring now to FIG. 8, the trainable transceiver 20 may include a remote start interface 198. The remote start interface 198 may be a remote start system included with the trainable transceiver 20. The remote start interface 198 may include components for receiving a wireless signal to start the vehicle. In some embodiments, the remote start interface 198 may include and/or be a wireless transceiver or receiver configured to receive a wireless signal. The remote start interface 198 may be coupled to a vehicle electronics system and/or otherwise may be configured to start the vehicle (e.g., turn on vehicle electronics, start an engine of the vehicle, and/or otherwise start the vehicle or vehicle systems) upon receiving a wireless signal. The remote start interface 198 may be configured to receive a wireless signal from a device such as a keyfob (e.g., using a radio frequency transceiver), an internet enabled device (e.g., using a cellular transceiver, intermediate device, and/or other internet connection), and/or otherwise be configured to receive a signal and/or instruction to start the vehicle.

In other embodiments, the remote start interface 198 of the trainable transceiver 20 does not include a transceiver or other remote start hardware. The remote start interface 198 may be coupled to one or more vehicle systems related to providing remote start functions to the vehicle. For example, the remote start interface 198 may be an interface coupled to a vehicle electronics system and able to communicate with a system or systems for handling remote start functions for the vehicle. In some embodiments, the trainable transceiver 20 may determine if the vehicle has received a remote start signal and/or has been started in response to receiving a remote start signal. The trainable transceiver 20 may make these determinations using the control circuit 24, memory 26, the remote start interface 198, and/or other components of the trainable transceiver 20 and/or a connection to one or more vehicle electronics systems.

In one embodiment, the trainable transceiver 20 may determine if a vehicle has received a remote start signal by also receiving the same signal. The trainable transceiver 20 may receive the wireless signal using the transceiver circuit 28 and/or an additional transceiver. The same wireless signal to remote start the vehicle may be received by both the trainable transceiver 20 and a transceiver or receiver of the vehicle for receiving remote start signals. In some embodiments, the trainable transceiver 20 may be trained to receive wireless control signals for remote starting the vehicle. In other embodiments, the trainable transceiver 20 may determine that the signal was a remote start signal based on one or more parameters of the signal and/or analysis conducted by the control circuit 24, memory 26, and or other hardware or software components of the trainable transceiver 20.

In some embodiments, the functions of the remote start interface 198 are performed by the control circuit 24 and/or memory 26 of the trainable transceiver 20. The functions described above with reference to FIG. 8 may be performed by a combination of the control circuit 24, memory 26, remote start interface 198, and/or other hardware and/or software components of the trainable transceiver 20.

Upon determining that a vehicle has received a remote start signal and/or the vehicle has been started in response to receiving a remote start signal, the trainable transceiver 20 may ensure that the vehicle is not in a closed garage. Advantageously, this may provide safe operation of the vehicle by remote starting. For example, ensuring that the garage door is open once a vehicle has been remote started may prevent a buildup of dangerous exhaust fumes.

In one embodiment, the trainable transceiver 20 determines that a vehicle has received a remote start signal and/or the vehicle has been started in response to receiving a remote start signal. The trainable transceiver 20 then determines if the vehicle is located in a garage. This may include using one or more cameras and image processing conducted by the control circuit 24 of the trainable transceiver 20. In other embodiments, the trainable transceiver 20 may use position information (e.g., from a GPS system) alone or in conjunction with other techniques to determine if the vehicle is in a garage. In further embodiments, the trainable transceiver 20 uses one or more cameras and one or more of the techniques described with reference to FIGS. 3-5B to identify a garage door associated with a garage door opener the trainable transceiver 20 is trained to control. If a garage door is detected using one or more of these techniques and/or other techniques, the trainable transceiver 20 may send an activation signal to the garage door opener associated with the garage door in order to open the garage door. In some embodiments, this process may provide an advantage of automatically opening the garage door for a user and thus being more convenient than a user manually activating the garage door opener.

Figure 9:
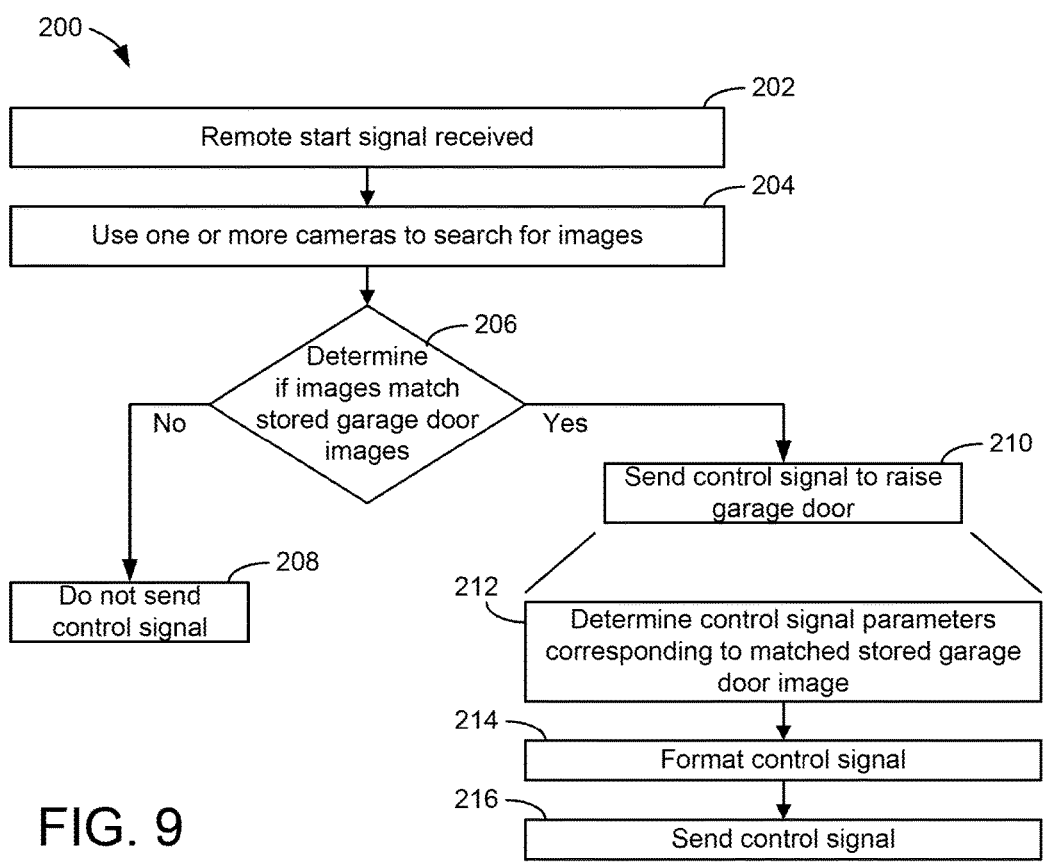
FIG. 9 illustrates a flow chart showing one embodiment of a method of sending an activation signal in response to a vehicle receiving a remote start signal.

Referring now to FIG. 9, a flow chart depicting an exemplary method 200 of activating a garage door opener in response to a remote start signal is illustrated. A remote start signal may be received (step 202). In some embodiments, the remote start signal is received by a vehicle electronics system and the trainable transceiver determines that the signal has been received (e.g., using the control circuit and/or an interface with the vehicle electronics system(s)). In other embodiments, the remote start signal is received by the trainable transceiver (e.g., using the transceiver circuit).

Upon receiving the remote start signal and/or upon detecting that the vehicle has been started, the trainable transceiver may use one or cameras to search for images (step 204). The trainable transceiver may control or otherwise receive images and/or image data from one or more vehicle cameras or other cameras (e.g., a camera coupled to or otherwise in communication with a garage door opener). The trainable transceiver use the images and/or image data to detect objects and/or images. The trainable transceiver may use one or more of the techniques described with reference to FIGS. 3-5B. For example, the trainable transceiver may determine if an image or images sensed by the camera(s) match comparison image(s) stored in memory (step 206). Alternatively, the trainable transceiver may determine identification information (e.g., using an image on a garage door with encoded information) and attempt to match the identification information to identification information stored in memory and corresponding to a device for which the trainable transceiver is trained to control.

If no match is found, the trainable transceiver may not send an activation signal (step 208). In some embodiments, the trainable transceiver may produce a warning to a vehicle occupant.

If the trainable transceiver determines that an image and/or image data matches an image and/or image data stored in memory, the trainable transceiver may send an activation signal to a device (e.g., garage door opener) which the trainable transceiver is trained to control and which corresponds to the image and/or image data stored in memory (step 210). Sending an activation signal may include determining the activation signal parameters for the activation signal (step 212). The trainable transceiver may retrieve activation signal parameters stored in memory corresponding to the object, image, and/or identification information stored in memory for the device the trainable transceiver is trained control. In other embodiments, this includes querying a database, server, cloud architecture, and/or other remote source which stores comparison images, comparison identification information, and/or activation signal parameters. The trainable transceiver may use the activation signal parameters to format an activation signal (e.g., using the control circuit, transceiver circuit, and/or other hardware or software of the trainable transceiver) (step 214). The trainable transceiver may then send the activation signal (e.g., using the transceiver circuit) (step 216).

The trainable transceiver system may be used to confirm a vehicle position within a garage. Advantageously, this may prevent a garage door from coming into contact with the vehicle and prevent damage to the vehicle and/or garage door. The trainable transceiver may use the control circuit, memory, camera interface, one or more cameras, and/or other hardware and software components to determine the position of the vehicle in a garage and/or determine if the vehicle is positioned such that a garage door will not contact the vehicle.

Figure 10A:
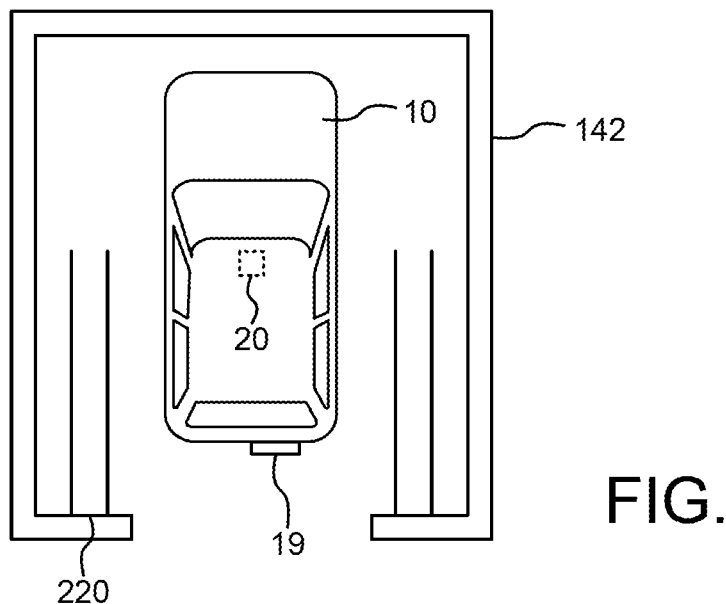
FIG. 10A illustrates a vehicle pulled into a garage including a rear facing camera according to an exemplary embodiment.

Referring to FIG. 10A, an exemplary embodiment of a trainable transceiver system for positioning a vehicle inside a garage is illustrated. In one embodiment, the trainable transceiver 20 receives images and/or image data from a rear facing camera. According to an exemplary embodiment, the rear facing camera is the rear facing camera 19 coupled to the vehicle 10 (e.g., coupled to the rear bumper of the vehicle 10). In other exemplary embodiments, the rear facing camera may be part of the trainable transceiver 20, integrated with a rear view mirror, coupled to a vehicle electronics system, and/or otherwise located in or on the vehicle and be in communication with the trainable transceiver 20. The trainable transceiver 20 may analyze one or images and/or image data from the camera(s) 19 (e.g., using image processing algorithms) to recognize the garage door track 220. The garage door track 220 can be a track, guide rail, or other feature for positioning, opening, and/or closing the garage door. The trainable transceiver 20 may analyze the images and/or image data to determine the location of the vehicle 10 relative to the garage door track 220. For example, the trainable transceiver 20 may apply an algorithm to determine the distance of the camera 19 and/or vehicle 10 from the garage door track 220. Using this information and/or additional information (e.g., information about the size of the vehicle, information about the garage, information about the camera(s), etc.), the trainable transceiver 20 may determine if the vehicle 10 is positioned such that the garage door will not come into contact with the vehicle 10 when closed.

In other embodiments, the trainable transceiver 20 determines the position of the vehicle 10 based on whether or not the images and/or image data indicate that the garage door track 220 is within the field of view of the camera(s) 19. For example, the trainable transceiver 20 may determine that the vehicle 10 is not well positioned in the garage 142 (e.g., such that the vehicle will not be contacted by a closing garage door) unless the images and/or image data indicate the presence of the garage door track 220. If the trainable transceiver 20 determines that the garage door track 220 is present in the image(s) and/or image data, the trainable transceiver 20 may determine that the vehicle 10 is well positioned.

In one embodiment, the trainable transceiver 20 may communicate positioning information to a vehicle occupant. For example, the trainable transceiver 20 may display an image from the rear facing camera 19 which assists an occupant of the vehicle 10 in positioning the vehicle 10 within the garage 142. The image or images may be displayed on a display integrated with the trainable transceiver 20, a display integrated in a rear view mirror, a display that is part of an infotainment system, and/or any display in communication with the trainable transceiver 20. In some embodiments, the trainable transceiver 20 may produce a warning or alert when the vehicle 10 is not well positioned in the garage 142. For example, if the vehicle 10 is put into park and the trainable transceiver 20 determines that the vehicle 10 is not well positioned in the garage 142, the trainable transceiver 20 may alert an occupant of the vehicle 10 with an audio and/or visual alter (e.g., displaying text, displaying a graphic, playing an audio noise and/or message, etc.). The alert may be generated using hardware included in the trainable transceiver 20 and/or hardware in communication with the trainable transceiver 20. In further embodiments, the trainable transceiver 20 may function as interlock and prevent the garage door opener from closing the garage door when the trainable transceiver 20 determines that the vehicle 10 is not well positioned in the garage 141. For example, the trainable transceiver 20 may send one or more activation signals to the garage door opener causing the garage door opener to open the garage door and/or keep the garage door opened. Alternatively, the trainable transceiver 20 may not accept a user input to close the garage door. The trainable transceiver 20 may communicate a message to a vehicle occupant that the vehicle 10 is not well positioned (e.g., a visual and/or audio message). In further embodiments, the trainable transceiver 20 may communicate the position of the vehicle 10 to the garage door opener. The garage door opener may be configured not to close the garage door until it receives position information indicating that the vehicle 10 is well positioned in the garage 142. In some embodiments, the trainable transceiver 20 may provide a visual and/or audio indication when the vehicle 10 is well positioned in the garage 142. The trainable transceiver 20 may display a message, display a graphic, play a noise, play an audio message, and/or otherwise indicate that the vehicle 10 is well positioned in the garage 142. For example, as the vehicle 10 pulls into the garage 142, the trainable transceiver 20 may process image(s) and/or image data to determine the position of the vehicle 10. Once the trainable transceiver 20 determines that the vehicle 10 is well positioned in the garage 142 (e.g., as the vehicle pulls into the garage), the trainable transceiver 20 may provide an indication to an occupant of the vehicle 10 that the vehicle 10 is well positioned in the garage 142.

Figure 10B:
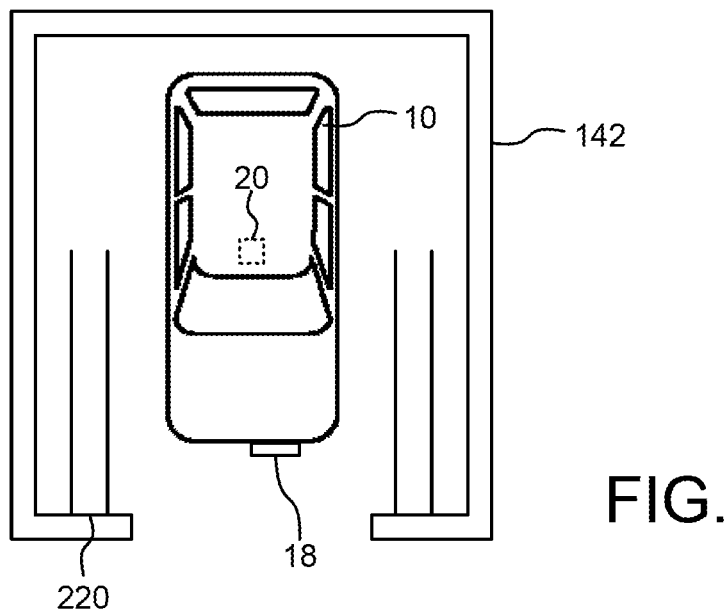
FIG. 10B illustrates a vehicle backed into a garage including a front facing camera according to an exemplary embodiment.

Referring now to FIG. 10B, an exemplary embodiment of a trainable transceiver system 20 for positioning a vehicle 10 inside a garage 142 is illustrated. The systems, techniques, and/or methods described above with respect to FIG. 10A may be used with respect to a vehicle 10 backing into a garage 142. A front facing camera may be used in place of the rear facing camera. According to an exemplary embodiment, the front facing camera is the front facing camera 18 coupled to the vehicle 10 (e.g., coupled to the front bumper of the vehicle 10). In other exemplary embodiments, the front facing camera may be part of the trainable transceiver 20, integrated with a rear view mirror, coupled to a vehicle electronics system, and/or otherwise located in or on the vehicle and be in communication with the trainable transceiver 20. For example, a front facing camera 18 may be used to provide image(s) and/or image data. The trainable transceiver 20 may determine a vehicle position 10 based on the image(s) and/or image data from the front facing camera 18. One or more of the above described techniques may be used to determine vehicle position. And, one or more of the above described functions may be performed (e.g., communicating with a vehicle occupant, interlock functions, etc.).

Figure 11A:
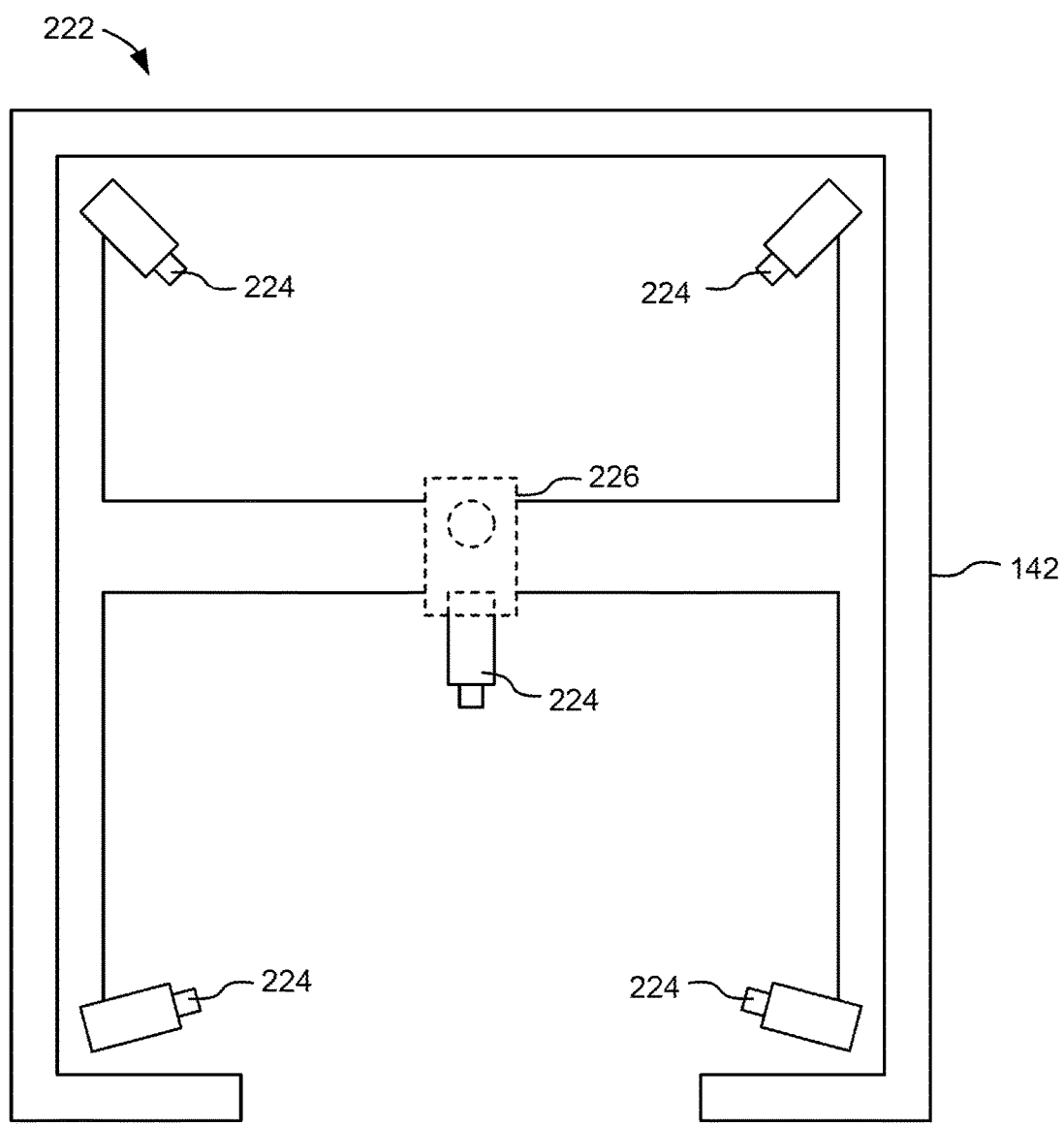
FIG. 11A illustrates one embodiment of a surround view camera system located in a garage.

Referring now to FIG. 11A, a surround view camera system 222 is illustrated according to one embodiment. A garage door opener 226 or other device may include and/or be in communication with a plurality of cameras 224. The cameras 224 may be located in the corners of the garage 142, on the walls of the garage 142, on the ceiling of the garage 142, mounted on the garage door opener 226, and/or in other locations in or on the garage 142. The cameras 224 may provide more than one viewing angle of a vehicle. The cameras 224 may be configured to provide images and/or image data from more than one angle. The trainable transceiver and/or the garage door opener 226 or other device may use images and/or image data corresponding to multiple viewing angles to determine if the vehicle is well positioned in the garage 142 and/or determine the position of the vehicle. For example, a control circuit in the trainable transceiver and/or the garage door opener 226 may process the images and/or image data. This may include applying image processing algorithms, object detection algorithms, and/or using hardware and/or software to detect the position of the vehicle based on images and/or image data. In some embodiments, the garage door opener 226 or other device may communicate the images and/or image data to the trainable transceiver for processing. For example, the garage door opener 226 may transmit images and/or image data to the trainable transceiver using a wireless transceiver. The trainable transceiver may receive the transmission using the transceiver circuit and/or an additional transceiver. In other embodiments, a plurality of cameras located on the vehicle are used to provide images and/or image data corresponding to multiple viewing angles. For example, the vehicle may include front facing cameras, rear facing cameras, side facing cameras, and/or cameras facing other directions relative to the vehicle. Using the position of the vehicle determined using these and/or other techniques described herein, the trainable transceiver and/or garage door opener 226 or other device may perform the functions described with reference to FIGS. 10A and 10B. For example, the trainable transceiver and/or garage door opener 226 or other device may communicate with a vehicle occupant (e.g., provide a warning, indicate that the vehicle is well positioned, and/or otherwise communicate), act as interlock to prevent closing of the garage door, and/or perform other functions.

In other embodiments, one or more cameras 224 may be mounted to the garage door opener 226. The one or more cameras 224 may provide images and/or image data for use as described above to determine the position of a vehicle. Advantageously, a camera or cameras 224 mounted to the garage door opener 226 may make instillation of the camera based positioning system easier. For example, upon installing the garage door opener 226, the cameras 224 would also be installed. Camera(s) 224 mounted on the garage door opener 226 may also provide an advantage as the camera(s) 224 may have a viewing angle that is oriented straight down towards the vehicle (e.g., a bird's eye view). This viewing angle may provide image(s) and/or image data which is easier to analyze in order to determine the position of the vehicle in the garage.

Figure 11B:
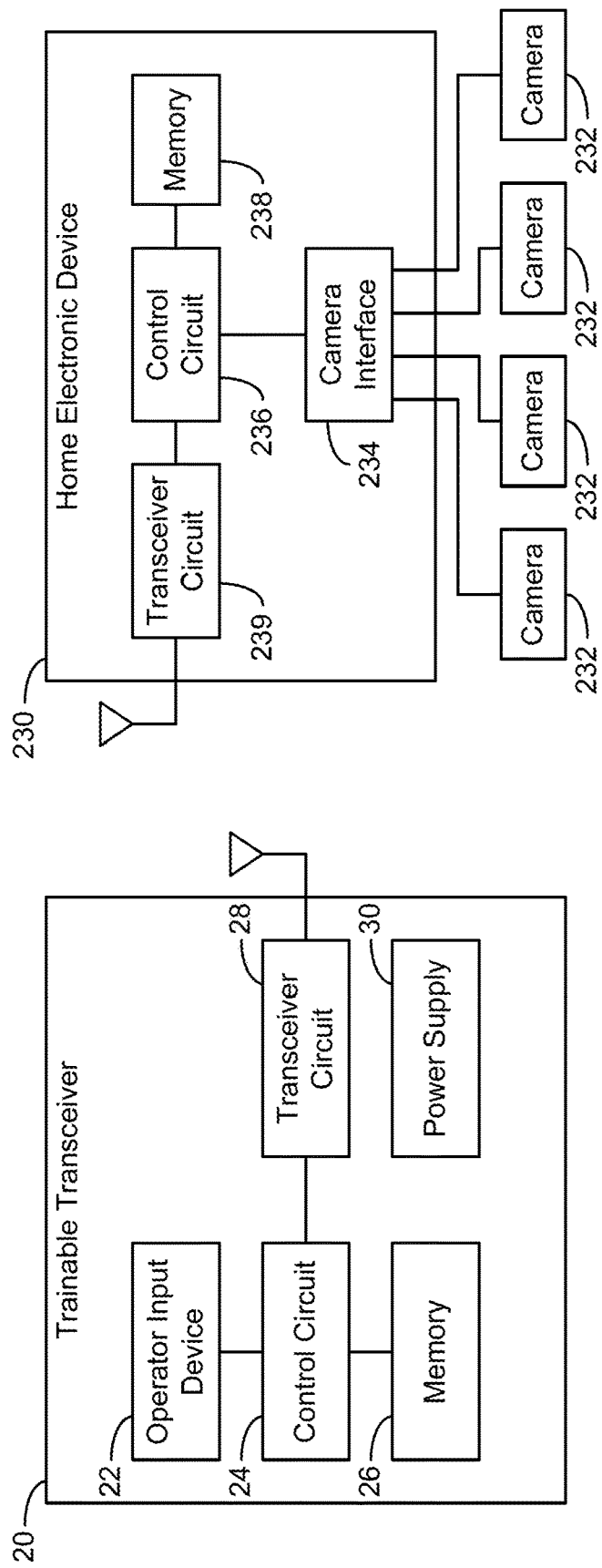
FIG. 11B illustrates a block diagram of a trainable transceiver and home electronic device having a camera interface and coupled to cameras according to an exemplary embodiment.

Referring now to FIG. 11B, an exemplary embodiment of a home electronic device 230 having a surround view camera system is illustrated. In some embodiments, the home electronic device 230 is a garage door opener. One or more cameras 232 may be in communication with the home electronic device 230. The home electronic device 230 may include a camera interface 234 to control the cameras 232, receive images and/or image data from the cameras 232, and/or otherwise communicate with the cameras 232. In one embodiment, the camera interface 234 and cameras 232 communicate using a wired connection. In other embodiments, the cameras 232 and/or camera interface 234 may include a transceiver allowing wireless communication. In alternative embodiments, the functions of the camera interface 234 are performed by a control circuit 236 of the home electronics device 230.

In some embodiments, the home electronics device includes a control circuit 236. The control circuit 236 may be coupled to memory 238 and/or a transceiver circuit 239. The control circuit 236, transceiver circuit 239, and/or memory 238 may be configured to receive activation signals. The home electronics device 230 may be further configured to carry out one or more actions (e.g., activating a garage door opener drive motor) in response to a received activation signal. In some embodiments, the control circuit 236 and/or memory 238 may be used to perform image processing functions, apply algorithms to images and/or image data, and/or perform other tasks or functions described above. The home electronics device 230 may communicate with the trainable transceiver 20 using the transceiver circuit 239 and/or an additional transceiver.

Figure 12:
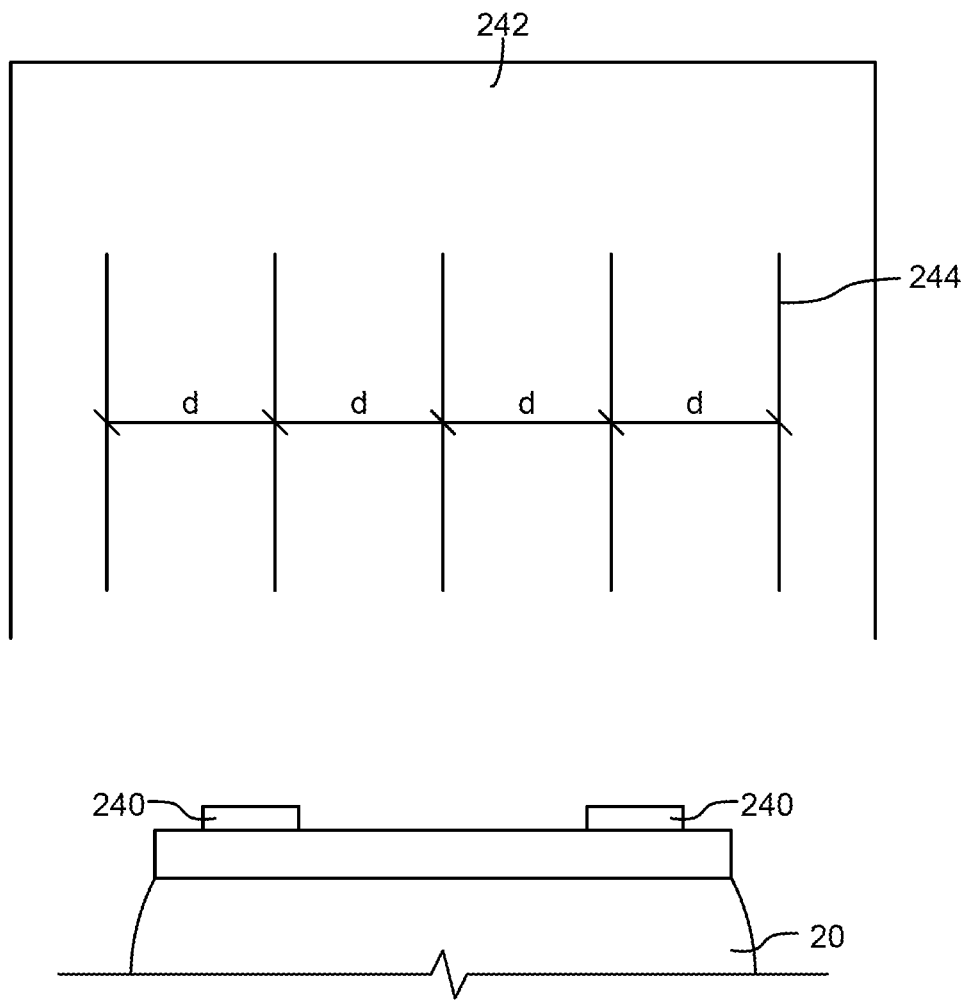
FIG. 12 illustrates an exemplary embodiment of a camera and trainable transceiver system for detecting distance relative to a vehicle.

Referring now to FIG. 12, an exemplary embodiment of a camera and trainable transceiver system for detecting distance is illustrated. In one embodiment, two or more cameras 240 are used to detect distance using stereo camera detection techniques. For example, one or more cameras 240 may be stereo cameras. Alternatively, three or more cameras may be used to provide images and/or image data for use in stereo camera distance detection. In one embodiment, stereo triangulation is used to determine distance. Other range imaging techniques may be used. In some embodiments, other and/or additional techniques may be used to determine the distance from a camera(s) or vehicle to an object. For example, image processing algorithms may be used in conjunction with range imaging algorithms. The control circuit and/or memory of the trainable transceiver may be used to determine the distance of the vehicle 10 relative to an object (e.g., a garage wall 242) using one or more of these techniques. In other embodiments, a home electronics device may determine the distance of the vehicle 10 relative another point or object using one or more of these techniques and/or hardware such as a control circuit and/or memory. The distance determined by one or more of these systems and/or techniques may be used in conjunction with the techniques described with reference to FIGS. 10A-11B to determine if the vehicle 10 is well positioned in a garage and/or otherwise determine the position of the vehicle 10 in the garage. In some embodiments using the stereo imaging techniques, markings 144 of a wall of the garage 242 and/or other object are not needed to determine the distance of the camera 240 from the wall or object and/or otherwise determine the position of the vehicle 10. In other embodiments, markings 244 may be used as reference points and/or otherwise used to determine distance and/or position of the vehicle 10.

In one embodiment, the rear wall 242 of a garage includes a plurality of markings 244. The markings 244 may be vertical lines on the garage wall. The markings 244 may be separated by a fixed distance. The distance may be known to the trainable transceiver and/or home electronics device determining distance and/or vehicle position. For example, a user of the trainable transceiver system may be instructed to create markings 244 with a specified distance which is stored in memory of the trainable transceiver. Alternatively, the trainable transceiver may determine the distance using one or more cameras 240 and/or image processing techniques. In other embodiments, markings 244 may be located on a side wall of a garage. The trainable transceiver may use a side facing camera in or on the vehicle and the markings 244 to determine how far a vehicle 10 is in the garage. For example, the number of markings 244 which the camera has viewed while the vehicle 10 is being pulled into the garage may be determined using image processing techniques. The trainable transceiver may determine the position of the vehicle 10 based on the number of markings which have been detected as the vehicle 10 pulls into the garage and the camera can view more markings.

Figure 13A:
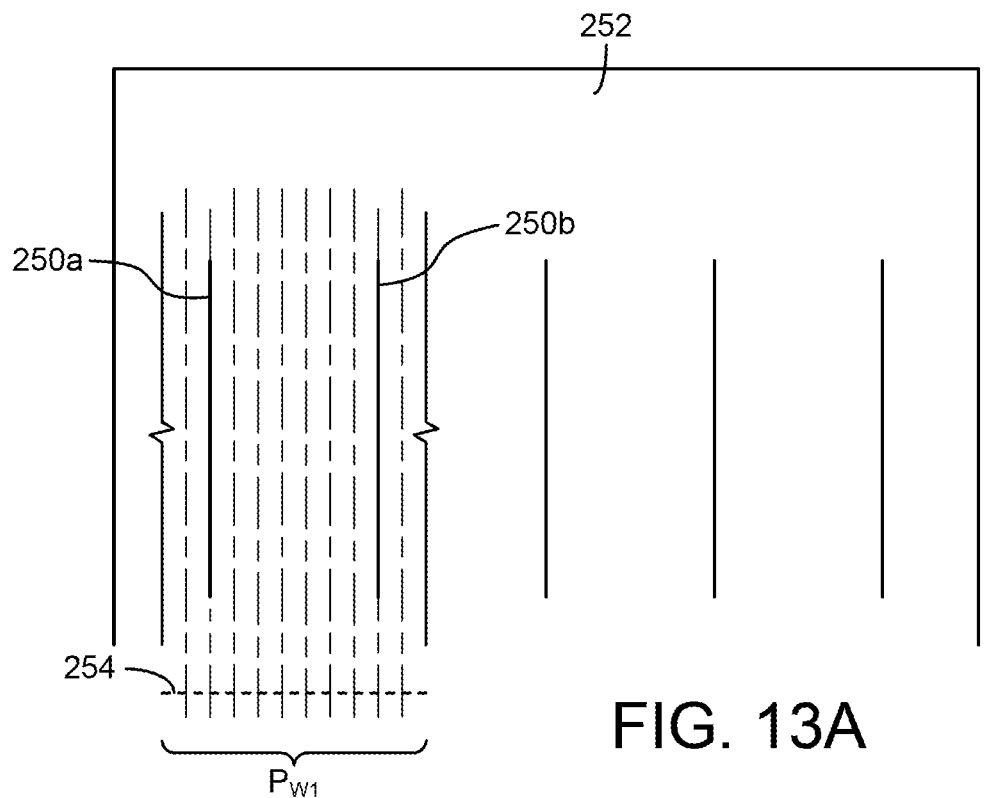
FIG. 13A illustrates one embodiment of wall markings for use with a single camera to determine a first distance.
Figure 13B:
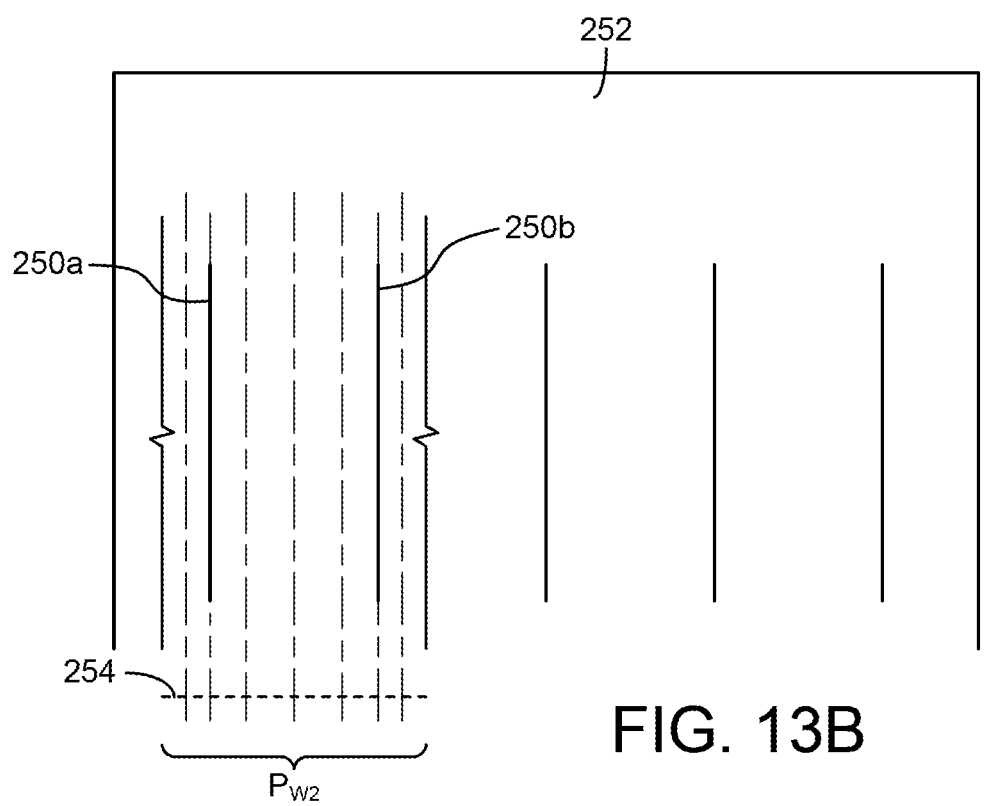
FIG. 13B illustrates one embodiment of wall markings for use with a single camera to determine distance at second distance closer to the wall.

In some embodiments, the markings allow a single camera to determine the distance between the camera and/or vehicle and the wall on which the markings are included. Referring now to FIGS. 13A and 13B, markings 250 on a rear wall 252 of a garage are shown according to exemplary embodiments. FIG. 13A corresponds to a first position of the vehicle and FIG. 13B corresponds to a second position of the vehicle which is closer to the rear wall 252 of the garage. A single camera may be used in conjunction with a control circuit, memory, and/or image recessing techniques to determine distance. For example, the markings 250 may have a known distance between markings, and image processing techniques may be used to determine the number of pixels along the horizontal axis 254 between a first marking 250*a* and a second marking 250*b*. Based on the known distance between the markings 250*a* and 250*b* and the corresponding number of pixels detected between the markings 250*a* and 250*b*, an algorithm may be used to determine the distance between the camera and the wall 252 on which the markings 250 are included. The algorithm may take into account the non-linear relationship between the distance of the camera from the markings 250 and the number of pixels between markings 250a and 250b caused by the focus of the camera. At a first distance of the camera to the wall 252 (e.g., illustrated in FIG. 13A), a first number of pixels along the width of the image and between the first marking 250a and the second marking 250b may be determined. This information may be used to determine the distance from the camera to the wall 252. At a second and closer distance of the camera to the wall 252 (e.g., illustrated in FIG. 13B), a second number of pixels along the width of the image and between the first marking 250a and the second marking 250b may be determined. A fewer number of pixels may be determined as the vehicle and therefore the camera is closer to the wall 252. This information may be used to determine a distance from the camera to the wall 252. Pixel position may be used to determine the distance between the camera and the wall using the lines and/or markings 250.

In one embodiment, the camera is located in the bumper of the vehicle (e.g., the rear facing camera 19 coupled to the vehicle 10). The distance from the camera to the wall 252 may be used as an approximate distance from the vehicle to the wall 252. In other embodiments, the camera may be located in another position in or on the vehicle. For example, the camera may be located in the rear view mirror of the vehicle (e.g., rear facing camera 68 of the rear view mirror 16). In some embodiments, a user may input the distance from the camera to the front of the vehicle (e.g., as part of a training process). In other embodiments, the trainable transceiver may determine the distance from the camera to the front of the vehicle using one or more image processing algorithms and/or other hardware or software. As explained above, the distance between the vehicle and the wall may be used to determine the position of the vehicle within the garage. These techniques for determining the position of the vehicle may be used with a rear facing camera(s) (e.g., when backing into the garage), a front facing camera(s) (e.g., when driving forward into the garage), a side facing camera(s), and/or other cameras.

In one embodiment, the markings 244 and 250 discussed with reference to FIGS. 12-13B are in the visible light spectrum. In other embodiments, the markings 244 and 250 are not in the visible light spectrum but are still visible to the cameras. The markings 244 and 250 may be made using invisible ink, security ink, or a similar substance. The markings 244 and 250 may be visible only in the ultraviolet spectrum. In some embodiments, the camera(s) accessible by the trainable transceiver are configured to detect, receive, process, and/or otherwise operate in the ultraviolet spectrum. This may be in addition to or in place of operating in the visible spectrum. In some embodiments, an additional camera for detecting the image is included in the vehicle, trainable transceiver, rear view mirror, or is otherwise configured to provide images in the ultraviolet spectrum to the trainable transceiver. In other embodiments, the markings 244 and 250 may be formed by ink visible in the infrared spectrum. The frequency of the light reflected from, produced from, generated by, or otherwise resulting from the ink or other substances or materials used to create the markings 244 and 250 may be outside the visible spectrum and be a frequency which is detected by the CCD and/or CMOS sensors used in one or cameras. In other embodiments, ink is used to block one or more of ultraviolet light and infrared light. The camera may sense an image formed by the lack of ultraviolet and/or infrared light produced form the garage door or other object onto which the ink has been placed.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A system for controlling remote devices, comprising:
a camera in a vehicle;
an output device; and
a control circuit of a trainable transceiver configured to:
use data from the camera to determine a position of the vehicle within a garage;
use the data from the camera to determine a distance between the vehicle and a wall of the garage;

determine, based on the position of the vehicle within the garage, whether a garage door will contact the vehicle upon activation of the garage door;

determine, based on the distance between the vehicle and the wall of the garage, whether the vehicle is well-positioned in the garage such that the garage door will not contact the vehicle upon activation;

provide an indication via the output device indicating whether the garage door will contact the vehicle upon activation; and automatically transmit an activation signal to a garage door opener communicatively coupled to the garage door formatted based on the determination that the garage door will not contact the vehicle upon activation.

2. The system of claim 1, wherein the control circuit is further configured to:

use the data from the camera to determine whether the garage door is closed and to determine whether the vehicle is approaching the garage door; and provide a warning indication via the output device based on the determination that the garage door is closed and that the vehicle is approaching the garage door.

3. The system of claim 1, wherein the control circuit is further configured to determine, based on vehicle size information and garage information, whether the garage door will contact the vehicle upon activation of the garage door.

4. The system of claim 1, further comprising a remote start interface coupled to the control circuit configured to receive a wireless remote start indication from at least one of a portable electronic device and a system of the vehicle; and wherein the control circuit is further configured to determine whether the garage door will contact the vehicle upon activation, responsive to the receipt of the wireless remote start indication.

5. The system of claim 1, further comprising a plurality of cameras including the camera, and wherein the control circuit is further configured to apply a stereo camera detection technique on the data received from the plurality of cameras to determine the position of the vehicle within the garage.

6. A method of controlling remote devices, comprising:

using image data from a camera in a vehicle to determine a position of the vehicle within a garage;

analyzing the image data from the camera to recognize a garage door track;

determining a distance between the vehicle and the garage door track based on identifying the garage door track from the image data;

determining, based on the position of the vehicle within the garage, whether a garage door will contact the vehicle upon activation of the garage door, wherein determining whether the garage door will contact the vehicle further comprises determining, based on the distance between the vehicle and the garage door track, whether the vehicle is well-positioned in the garage such that the garage door will not contact the vehicle upon activation;

providing an indication via the output device indicating whether the garage door will contact the vehicle upon activation;

formatting, based on the determination of whether the garage door will contact the vehicle upon activation, an activation signal to transmit to a garage door opener communicatively coupled to the garage door; and automatically transmitting an activation signal to a garage door opener communicatively coupled to the garage door formatted based on the determination that the garage door will not contact the vehicle upon activation.

7. The method of claim 6, further comprising:

receiving a wireless remote start indication from at least one of a portable electronic device and a system of the vehicle; and wherein determining whether the garage door will contact the vehicle further comprises determining whether the garage door will contact the vehicle, responsive to receiving the wireless start indication.

8. The method of claim 6, wherein using the image data further comprises applying a stereo camera detection technique on the image data received from a plurality of cameras to determine the position of the vehicle within the garage.

9. The method of claim 6, wherein determining whether the garage door will contact the vehicle further comprises determining whether the garage door will contact the vehicle upon activation based on vehicle size information and garage information.

10. A trainable transceiver for controlling remote devices, comprising:

a camera interface configured to receive image data;

an output device;

a transceiver circuit; and a control circuit coupled to the camera interface, the output device, and the transceiver circuit, the control circuit configured to:

analyze the image data received via the camera interface to recognize markings on a wall of the garage;

determine a position of the vehicle within a garage based on the image data received via the camera interface;

use the markings on the wall of the garage to determine a distance between the vehicle and the wall of the garage;

determine, based on the distance between the vehicle and the wall of the garage, whether the vehicle is well-positioned in the garage such that the garage door will not contact the vehicle upon activation;

determine whether a garage door will contact the vehicle upon activation of the garage door based on the position of the vehicle within the garage;

provide an indication using the output device indicating whether the garage door will contact the vehicle upon activation;

format, based on the determination of whether the garage door will contact the vehicle upon activation, an activation signal to transmit to a garage door opener communicatively coupled to the garage door; and transmit, via the transceiver circuit, the activation signal to the garage door opener for operating the garage door.

11. The trainable transceiver of claim 10, wherein the control circuit is further configured to use the data from the camera to determine whether the garage door is closed and to determine whether the vehicle is approaching the garage door; and provide a warning indication via the output device based on the determination that the garage door is closed and that the vehicle is approaching the garage door.

12. The trainable transceiver of claim 10, wherein the control circuit is further configured to determine, based on vehicle size information and garage information, whether the garage door will contact the vehicle upon activation of the garage door.

13. The trainable transceiver of claim 10, wherein the camera interface is further configured to receive the image data from a plurality of cameras; and
   wherein the control circuit is further configured to apply a stereo camera detection technique on the image data from the plurality of cameras to determine the position of the vehicle within the garage and to determine whether the garage door will contact the vehicle upon activation.

14. The trainable transceiver of claim 10, further comprising a remote start interface coupled to the control circuit configured to receive a wireless remote start indication; and
   wherein the control circuit is further configured to determine whether the garage door will contact the vehicle upon activation, responsive to the receipt of the wireless remote start indication.

* * * * *